(12) United States Patent
Andersson et al.

(10) Patent No.: US 11,153,409 B2
(45) Date of Patent: Oct. 19, 2021

(54) REDUNDANCY IN A NETWORK CENTRIC PROCESS CONTROL SYSTEM

(71) Applicant: ABB Schweiz AG, Baden (CH)

(72) Inventors: Staffan Andersson, Lund (SE); Åke Bromö, Västerås (SE); Anders Rune, Västerås (SE); Mats Rågberger, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/805,134

(22) Filed: Feb. 28, 2020

(65) Prior Publication Data
US 2020/0280615 A1 Sep. 3, 2020

(30) Foreign Application Priority Data

Mar. 1, 2019 (EP) ..................................... 19160290

(51) Int. Cl.
*G05B 19/418* (2006.01)
*H04L 29/08* (2006.01)

(52) U.S. Cl.
CPC ...... *H04L 67/2852* (2013.01); *G05B 19/4184* (2013.01); *G05B 19/4185* (2013.01); *H04L 67/125* (2013.01)

(58) Field of Classification Search
CPC .............. H04L 67/2852; H04L 67/125; G05B 19/4184; G05B 19/4185
(Continued)

(56) References Cited

U.S. PATENT DOCUMENTS 10,270,689 B2 * 4/2019 Azgin ..................... H04L 45/58
2002/0083364 A1 6/2002 Christensen et al.
(Continued)

FOREIGN PATENT DOCUMENTS

| WO | WO-2017085557 A1 * | 5/2017 | ........... G05D 7/0676 |
| WO | 2017187273 A1 | 11/2017 | |
| WO | WO-2017187273 A1 * | 11/2017 | ........... G06F 11/3495 |

OTHER PUBLICATIONS

European Search Report Application No. EP 19 16 1290 Completed: Nov. 13, 2019; dated Nov. 19, 2019 11 pages.

*Primary Examiner* — Ly D Pham
(74) *Attorney, Agent, or Firm* — Whitmyer IP Group LLC

(57) ABSTRACT

A method for providing redundancy in a network centric process control system, where at least one node includes at least one control service as well as at least one middleware service for communicating in the process control system, where the control service and middleware service is each a separate executable running in a separate operating system process provided by a real time operating system thereof, wherein a first control service in a first node communicating via a first middleware service and implementing a first control function acts as an active control service for the first control function and a second control service communicating via a second middleware service and implementing the first control function acts as a standby control service for the first control function, the method including performing, by the first control service, the first control function through subscribing, via the first middleware service, to input process data of the first control function and publishing via the first middleware service, output process data of the first control function, synchronizing the first control service with the second control service, and taking over, by the second control service based on a determination that a fault has occurred in the first node, the role of active control service, the taking over including publishing, by the second control service via a second middleware service provided for the second control service, the output process data of the first control function based on a subscription of the second control service to the input process data.

15 Claims, 17 Drawing Sheets

(58) Field of Classification Search
USPC .......................................................... 700/82
See application file for complete search history.

(56) References Cited

U.S. PATENT DOCUMENTS

| | | | |
|---|---|---|---|
| 2006/0018283 A1* | 1/2006 | Lewis | H04W 92/02 |
| | | | 370/331 |
| 2006/0056285 A1 | 3/2006 | Krajewski et al. | |
| 2008/0279133 A1* | 11/2008 | Bienfait | H04L 67/16 |
| | | | 370/315 |
| 2015/0101019 A1* | 4/2015 | Yeung | H04W 4/023 |
| | | | 726/4 |
| 2019/0324796 A1* | 10/2019 | Standley | G06F 11/2023 |
| 2020/0280615 A1* | 9/2020 | Andersson | G05B 19/4184 |

* cited by examiner

REDUNDANCY IN A NETWORK CENTRIC PROCESS CONTROL SYSTEM

TECHNICAL FIELD

The present disclosure relates to a network centric process control system as well as to a method, and a computer program for providing redundancy in a network centric process control system.

BACKGROUND

Redundancy is an important aspect of process control systems in order to avoid unnecessary disruption in case of failures.

Some process control systems have a redundancy concept based on multiplicated (duplicated, triplicated etc.) hardware units. Other process control systems have a redundancy concept based on one hardware unit being redundant for multiple hardware units. Very few or no process control systems provides software redundancy (multi-version fault tolerance) or a combination of software and hardware redundancy for very high availability.

In order to have different levels of availability for different system parts in a process control system, an engineer may need to select system parts from different vendors which typically has a cost in terms of extra engineering. Alternatively, the engineer can select the same availability level for all system parts, which typically will increase the process control system hardware cost.

If a customer needs to increase the availability for some parts of the process control system, e.g. by adding software redundancy to some of the hardware redundant controllers, this is generally not possible in process control system of today.

SUMMARY

One objective is to provide flexible redundancy for a process control system node, such as a controller, gateway or a device acting as an interface to the process being controlled.

According to a first aspect there is presented a method for providing redundancy in a network centric process control system, where at least one node comprises at least one control service as well as at least one middleware service for communicating in the process control system, where the control service and middleware service is each a separate executable running in a separate operating system process provided by a real time operating system thereof, wherein a first control service in a first node communicating via a first middleware service and implementing a first control function is set to act as an active control service for the first control function and a second control service communicating via a second middleware service and implementing the first control function is set to act as a standby control service for the first control function, the method comprising:

performing, by the first control service, the first control function through subscribing, via the first middleware service, to input process data of the first control function and publishing, via the first middleware service, output process data of the first control function, synchronizing the first control service with the second control service, and taking over, by the second control service based on a determination that a fault has occurred in the first node, the role of active control service, the taking over comprising publishing, by the second control service via the second middleware service, the output process data of the first control function based on a subscription of the second control service to the input process data.

According to a second aspect there is presented a network centric process control system comprising nodes, each node comprising a processor and a computer program product storing instructions that, when executed by the processor, causes the node to run at least one control service, where the system comprises at least one control service as well as at least one a middleware service for communicating in the process control system, where the control service and middleware service is each a separate executable running in a separate operating system process provided by a real time operating system thereof, wherein in the network centric process control system, a first control service in a first node communicating via a first middleware service and implementing a first control function is set to act as an active control service for the first control function by performing the first control function through subscribing, via the first middleware service, to input process data of the first control function and publishing, via the first middleware service, output process data of the first control function, a second control service communicating via a second middleware service and implementing the first control function is set to act as a standby control service for the first control service, wherein the first and second process control services are set to synchronize with each other, and the second control service is configured to take over the roll of active control service based on a determination that a fault has occurred in the first node, the taking over comprising publishing, by the second control service, via the second middleware service, the output process data of the first control function based on a subscription of the second control service to the input process data.

According to a third aspect there is presented a computer program for providing redundancy in a network centric process control system comprising at least one control service as well as at least one middleware service for communicating in the process control system, where the control service and middleware service is each a separate executable running in a separate operating system process provided by a real time operating system thereof, wherein a first control service in a first node communicating via a first middleware service and implementing a first control function is set to act as an active control service for the first control function and a second control service communicating via a second middleware service and implementing the first control function is set to act as a standby control service for the first control function, the computer program comprising computer program code, which when run in network centric process control system:

causes the first control service to perform the first control function through subscribing, via the first middleware service, to input process data of the first control function and publish, via the first middleware service, output process data of the first control function, causes the first and second process control services to synchronize with each other, and causes, the second control service to take over the roll of active control service based on a determination that a fault has occurred in the first node, the taking over comprising publishing, by the second control service via the second middleware service, the output process data of the first control function based on a subscription of the second control service to the input process data.

The presented solution enables flexible redundancy for controllers, gateways and devices with respect to hardware and/or software. Different system parts can be configured for different levels of availability, based on criticality, cost etc. Different types of hardware redundancy; hardware redundancy based on multiplicated hardware units, hardware redundancy based on one hardware unit being redundant for multiple hardware units, hardware redundancy based on spare capacity in other controllers, gateways and devices, and hardware redundancy based on edge and cloud resources.

The flexibility is enabled since all nodes such as controllers, gateways and devices, have a middleware service for signal exchange that makes it possible for any control service to access any signal in any other control service without knowledge of network layout, control service deployment, or control service internals. The middleware services make it possible to move a signal publisher from one node to another without affecting the subscribers, and vice versa.

The first control service and the second control service may be provided in the same node. As an alternative it is possible that they are provided in different nodes.

The publishing of data may comprise copying by a control service to a middleware service, and publishing, by the middleware service the data in the network centric process control system and/or to another control service executing in the same node.

The publishing of data may comprise grouping, by the middleware service, publishing process data in data sets, wherein each data set is assigned a multicast address. Thereby the process data publishing and subscribing may be bound by multicast addresses.

The published process data may additionally comprise an identity unique in the network centric process control system, a data type for process data, and process data.

In one variation the realization of the first control function in the first control service is at least partly different from the realization of the first control function in the second control service. It is for instance possible that the source codes differ.

In another variation the realization of the first control function in the first control service is the same as the realization of the first control function in the second control service. In this case it is possible that the source codes are identical.

In one variation, the synchronizing of the first control service with the second control service comprises the first control service sending data needed for standby operation and the second control service receiving the data needed for standby operation.

In another variation of the first aspect, the method further comprises subscribing, by the second control service, to input process data of the first control function prior to taking over the role of active control service and blocking, in the second control service, input process data from being used and output process data from being published and removing the blocking after the taking over the role of active control service.

In a corresponding variation of the second aspect, wherein, when the second control service is set to act as a redundant control service, there is a blocking of input process data from being used in the second control service prior to taking over the role of active control service, and the second control service is set to subscribe to input process data of the first control function, wherein the blocking is removed after the second control service has taken over the role of active control service.

The first node may additionally comprise a first node manager configured to monitor the operation of the first node and trigger the taking over of the role as active control service by the second control service. The method may thereby additionally comprise monitoring, by the first node manager, the operation of the first node and triggering, by the first node manager, the taking over of the role as active control service by the second control service in case of a fault. The triggering may in this case involve the first node manager determining that there is a fault in the first node and instruct the second control service to take over.

The first node manager may control and possibly also perform communication in the synchronizing of the first and second control services.

When the first and second control services are provided in the same node, e.g. the first node, the first node manager may additionally remove the blocking.

When the first and second control services are provided in different nodes, the second control service may be provided in a second node. It is in this case also possible that the second node comprises a second node manager that removes the blocking. In this case it is possible that the second node manager performs communication in the synchronizing of the first and second control services. The second node manager may in this case also determine that a fault has occurred in the first node. The triggering may in this case be caused by the first node stopping to work. For this reason, the second node manager may monitor the first node. One way in which this may be done is through the second node manager monitoring keep-alive messages sent by the first node manager. An absence of keep-alive messages may thus be trigger for taking over.

In another variation the synchronization of data needed for standby operation comprises synchronizing states in the first control function.

The sending of data needed for standby operation when synchronizing states may according to one variation comprise sending states of the first control service to the second control service for application in the second control service.

The synchronizing of states may according to another version comprise sending process input data and triggers causing state changes in the second control service. In this case the method may further comprise executing the triggers that cause state changes in parallel in the first and second control service and in the network centric process control system the first and second control services may be set to execute the triggers causing state changes in parallel.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
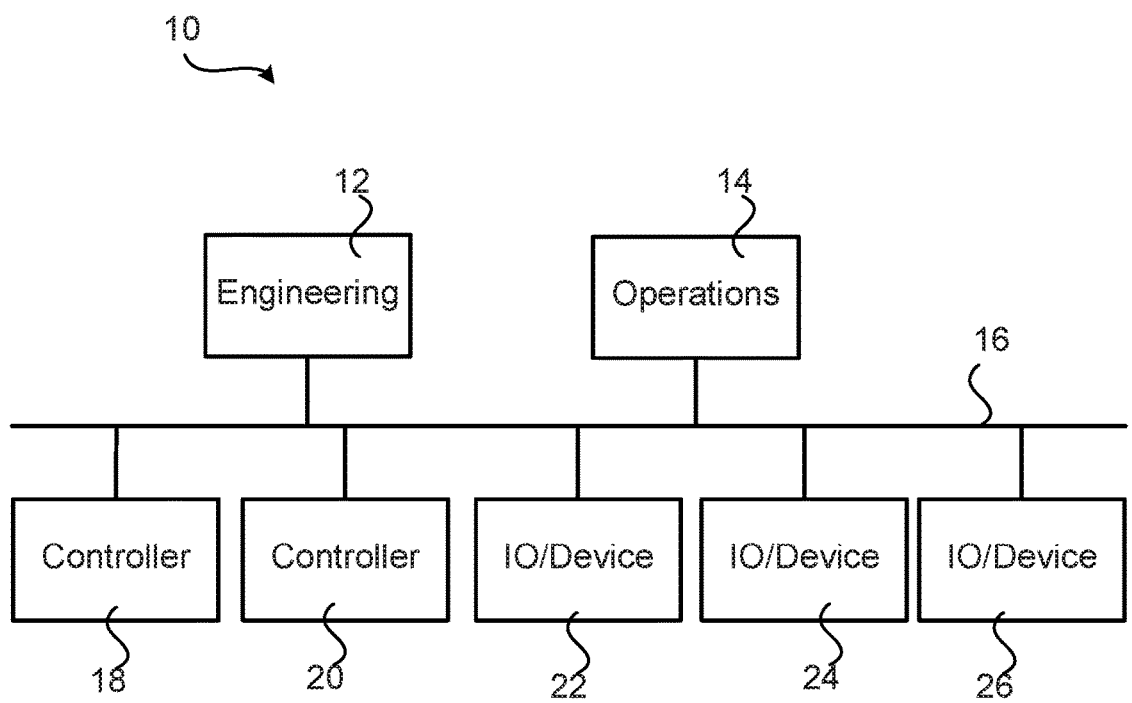
FIG. 1 schematically illustrates a network centric process control system.

FIG. 1 shows an example of a network centric process control system 10 comprising an engineering terminal 12 and an operations terminal 14 connected to a network 16. To the network 16 there is also connected a first controller 18, a second controller 20, a first IO/device 22, a second IO/device 24 and a third IO/device 26. It should here be realized that the number and types of equipment shown in FIG. 1 are mere examples and there may be more or fewer. There may additionally be other units in the network centric control system. The equipment may additionally be provided at different hierarchical levels.

In the network centric process control system 10, as illustrated in FIG. 1 in a logical topology, IO and devices 22, 24 and 26 are not "owned" or controlled by any controller 18 and 20, as in a controller centric architecture. An engineering tool for JO and device configuration, for instance provided via the engineering terminal 12, may deploy configuration data to the IO and devices without involving a controller. Controllers 18 and 20 are focused on execution of control logic and can access IO signals from any IO or device. The network centric process control system architecture provides a system-wide easy access to IO and device information from upper system levels, such as operations 14 and engineering 12, without any routing of information through the controller. The control logic doesn't have to be updated to access IO and device information.

However, most IO and devices of today, and for several years to come, are connected through a fieldbus protocol. Therefore, a gateway that connects the IO and field devices to the network centric process control system may be needed. These gateways handle configuration and scanning of the IO and devices on a field bus. Special connections may also be needed for other purposes, such as for connection to Internet of Things (IoT) devices.

In general terms, the exchange of process data between control services is handled by middleware service. Data is then represented as signals. The control services represent the principal services in controllers, gateways and devices, e.g. execution of control logic in a controller, scanning of I/O and field devices in a fieldbus gateway, managing the device functionality in a device, etc.

Control services are typically allocated in different nodes, with one or multiple control services per node.

In general terms, a control service has no knowledge about where other control services that it interacts with are located. This is handled by the middleware services and is transparent to the control service.

Figure 2:
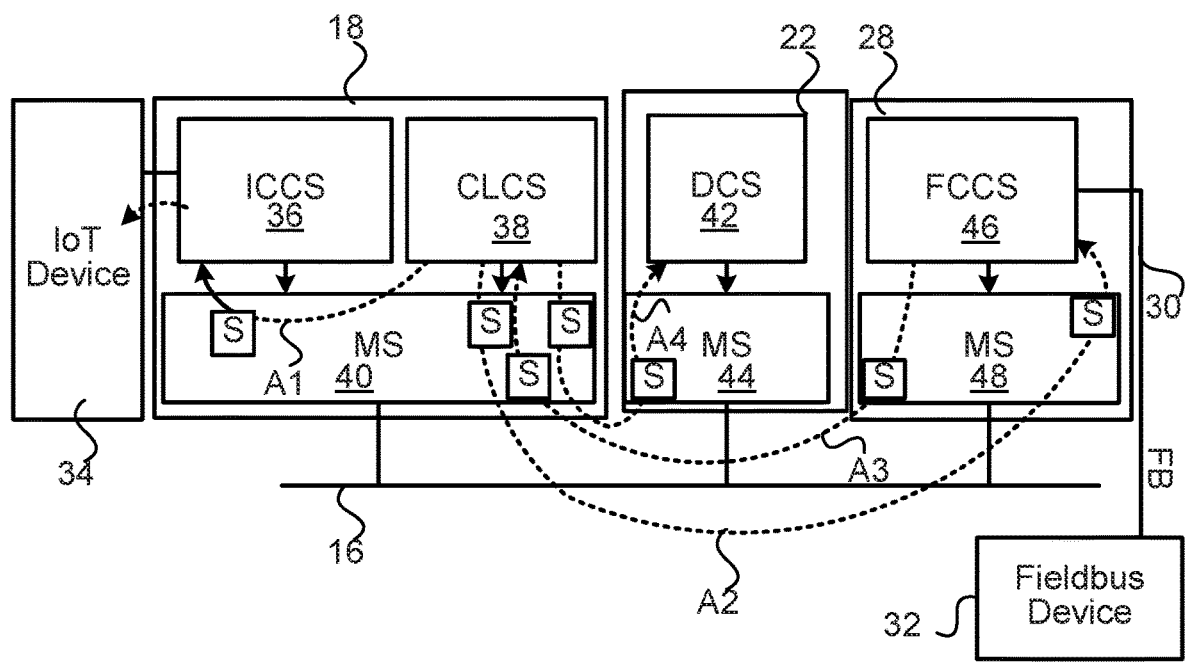
FIG. 2 schematically illustrates control services allocated to different nodes of the network centric process control system.

FIG. 2 shows examples of a few different nodes and control services that can appear in the network centric process control system 10. In the figure there are four control services 36, 38, 42 and 46 executing in three nodes; a device 22, a fieldbus gateway 28 and a controller 18, where the controller 18 hosts two control services 36 and 38. All three nodes 28, 22 and 28 are connected to the network 16 and have a middleware service (MS) for communication in the process control system 10. The middleware service more particularly handles signal exchange between the control services in the different nodes 18, 22 and 28 as well as between control services allocated in the same node (i.e. in the controller 18 in this example).

More particularly, in the example of FIG. 2 there are is an IoT Connect Control Service (ICCS) 36 and a Control Logic Control Service (CLCS) 38. The IoT Connect Control Service 36 comprises functionality such as communication protocols for communicating with IoT devices, where one such IoT device 34 is shown. There is also a middleware service 40 in the controller node 18 for handling communication of the control services 36 and 38 with control services of other entities using the network 16. These other control services, which also employ middleware services, may be provided in other controllers, IO/Devices and Fieldbus Gateways. The device 22 likewise comprises a control service, here in the form of a Device Control Service (DCS) 42, and a middleware service (MS) 44, where the middleware service 44 handles communication of the Device Control Service 42 with control services of other entities using the network 16. Finally, FIG. 2 shows a fieldbus gateway 28 comprising a Fieldbus Connect Control Service (FCCS) 46 and a middleware service (MS) 48. In this case the Fieldbus Connect Control Service 46 is also connected to a Fieldbus (FB) 30 for communication with a field device, which in this case thus is a fieldbus device 32. The Fieldbus Connect Control Service 46 comprises Fieldbus communication protocols for allowing communication with the Fieldbus Device 32. The middleware service 48 is here used for allowing the Fieldbus Connect Control Service 46 to communicate with the control services of other entities using the network 16. Finally, the figure shows signals S, dependencies in the form of solid straight arrows and data flows in the form of dashed curved arrows. As an example, a first arrow A1 schematically shows a signal S being provided from the Control Logic Control Service 38 to the IoT device 34 via the Middleware Service 40 and the IoT Connect Control Service 36. A second arrow A2 schematically shows a signal S provided from the Control Logic Control Service 38 also provides a signal S to Fieldbus Connect Control Service 46 via Middleware Service 40 and Middleware Service 48. A third arrow A3 shows a signal S provided from the Fieldbus Connect Control Service 46 to the Control Logic Control Service 38 via Middleware Service 48 and Middleware Service 40. Finally, a fourth arrow A4 is shown as providing a signal S from Control Logic Control Service 38 to the Device Control Service 42 via Middleware Services 40 and 44.

Interactions with controllers, devices etc. not using middleware services, are handled by control services specific for the communication protocol needed for the interaction, as illustrated in FIG. 2. The IoT Connect Control Service 36 does for instance operatively connect the controller 18 to IoT Device 34 and the Fieldbus Connect Control Service 46 of a Fieldbus Gateway 28 operatively connects the Fieldbus Gateway 28 to Fieldbus Devices 32, e.g. Profibus devices. Such control services can execute in any node, e.g. in the controller node 18, as the IoT Connect Control Service 36, or in a separate node, as the Fieldbus Connect Control Service 46. However, some control services, e.g. a Profibus Connect Control Service, may require specific hardware support for its connection, such as for connection to a fieldbus.

It should be realized that it may be possible for field devices being realised using control services and middleware services and directly connected to the network 16. It should also be realized that a process control system may comprise a wireless gateway for communicating with wireless field devices via a wireless network. In this case the wireless gateway may be provided with a wireless connect control service and a middleware for communicating with other entities via the bus 16.

Middleware services and control services may be provided as separate executables, running in separate operating system processes, for memory protection and isolation of faults. A control service may additionally interact with a middleware service through inter process communication. This makes it possible for any control service to access any signal in any other control service without knowledge of network layout, control service deployment, or control service internals.

Control services may be configured by a set of engineering tools. There may for instance be one tool for each control service type, e.g. one engineering tool for control logic configuration and another tool for I/O entity configuration and device configuration. This gives an isolation of e.g. control logic engineering from I/O engineering. That is, the control logic can be completely engineered without knowledge of where it will be executed, or how/where the I/O entities and devices are connected.

Middleware services may be configured by a middleware configuration component, which uses signal definitions provided by the engineering tools to create the middleware service configuration. The middleware service configuration may be sent with the control service configuration and forwarded to the middleware by the control services.

Aspects described herein are directed towards using publishing of and subscribing to signals. In general terms, a signal defines a contract/interface between a publisher and a subscriber for process data to be exchanged. A signal may comprise one or more of the following attributes: a system unique signal identity (ID), a data type for the signal value, such as Boolean for digital signals or float for analogue signals, a range or interval and an engineering unit for the signal value (for analog signals only), an override value used by the signal subscriber in case of bad signal quality, e.g. if the subscriber did not get any signals from the publisher, e.g. due to network error, and a substitute value used by the signal publisher in case of bad signal quality, e.g. if an IO scanner has detected an error on an input channel on a fieldbus device. Signals may be configured and connected to control logic variables and I/O channels, in the engineering tools for control logic and I/O engineering and downloaded to the nodes. It is the responsibility of the middleware configuration component to guarantee that the signal IDs are unique within the system.

Figure 3:
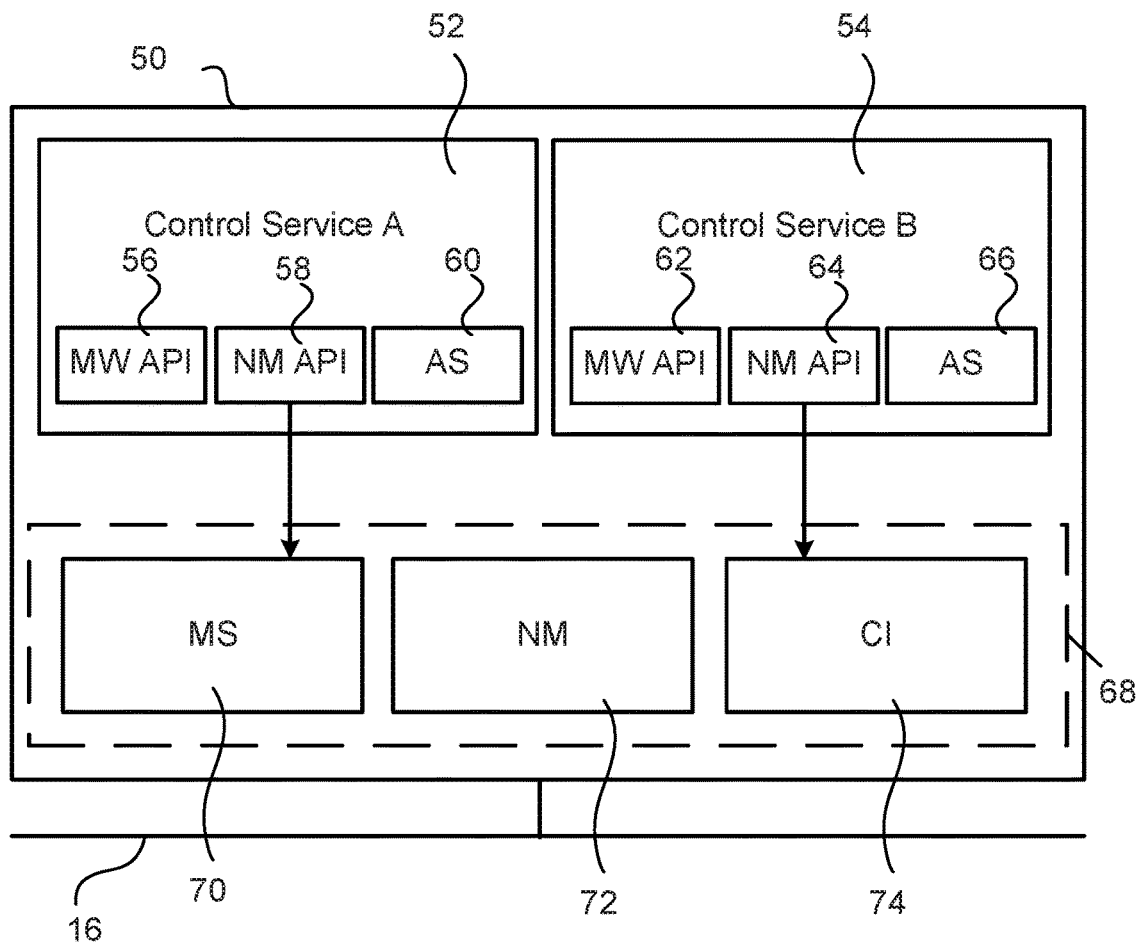
FIG. 3 schematically illustrates a node architecture for controllers, gateways and devices in the network centric process control system.

FIG. 3 schematically shows a node architecture of a generalized node 50 for allowing the previously described interaction of control service with middleware service. The node architecture of this generalized node 50 may thus be implemented in any of the previously described nodes, such as the Controller Node, Device Node and Fieldbus Gateway Node. As can be seen the generalized node 50 comprises two control services (CS) 52 and 54, where Control Service 52 implements a control function A and Control Service 54 implements a control function B, which functions may be process control functions. As is understood from the description made above, it is possible with only one control service in a node.

The node 50 has one or multiple control services or control service components 52 and 54 running on a platform 68. The platform 68 may comprise the following components: middleware service (MS) 70, a node manager (NM) 72, and a Communication Interface (CI) 74, which may also be denoted a vertical communication component because it is used for vertical communication in the hierarchical structure of the process control system.

To simplify the control service implementation and to harmonize the control services behavior, the control service is provided with three subcomponents; Middleware Application Programing Interface (MW API), Node Manager API (NM API), and an address space (AS) to be used in the control service interactions with the platform 68. As can be seen in FIG. 3, Control Service A 52 comprises MW API 56, NM API 58 and AS 60, while Control Service B 54 comprises MW API 62, NM API 64 and AS 66. These subcomponents can also be copied to be part of the platform components. That is, in some examples the control service component comprises a Middleware API, a Node Manager API, and an Address Space.

Each component has its own database for runtime and configuration data. That is, there is no separate component acting as a central database used by all components. The component runtime database may be optimized for the most frequent data accesses, e.g. for control logic execution and allows control services to have a specific information model, e.g. IEC 61131-3 information model with program organization units (POUs), variables, etc. Information not needed by other components may be hidden inside the control service. In this respect, the database might be provided as anything that is configured to store data such as a traditional database, a class, a table, or any other type of suitable data structure.

Generally speaking a control service needing process data or runtime data for its operation, sometimes referred to as input process data or input runtime data, may be set to subscribe to the process data, which process data may comprise control signals, status data and/or process measurement values. A control service delivering process data, sometimes referred to as output process data or output runtime data, may in turn publish the process data, which may also comprise control signals, status data and/or process measurement values. The process data being published may be grouped in data sets. Each data set may additionally be assigned to a multicast address, e.g. IPV4 or IPV6. Binding of signal subscribers and signal publishers may be based on the Open Platform Communications Unified Architecture (OPC UA) standard of the OPC foundation, OPC UA PubSub with dynamic multicast filtering in the network and publish/subscribe to multicast addresses. The middleware service subscribes to data set multicast addresses on the network, and when the middleware service publishes a data set on one of these multicast addresses, the dynamic multicast filtering in the network ensures that this data set is distributed only to the nodes that have subscribed to this multicast address, e.g. by switches. Other protocols and mechanisms than OPC UA PubSub with dynamic multicast filtering may be used for the binding of publishers and subscribers, e.g. OPC UA client/server with additional discovery services.

It can thereby be seen that all the control services of a node are communicating with other control services via a middleware service of the node using publication of process data and subscription to process data. By using multicasting, the process data publishing and the subscribing are bound by multicast addresses.

Alarm signals and event data may typically be handled by the communication interface 74 for vertical communication.

The node manager 72 may be configured for the startup of all components in the node 50 and may additionally be configured for supervision of the runtime behavior, health, etc. for the components.

As can be seen above, the above-described node architecture provides the control logic independently of where it is executed and is implemented without requiring knowledge of how I/O entities and devices are connected. This may be of interest to use in a number of special cases, and then especially in relation to redundancy, where one entity is active and a parallel entity is in standby.

Redundancy may with advantage be handled by the previously described node manager 72 in the node 50. In the handling of redundancy, the run time data of interest may additionally be divided in two categories, runtime data containing states that must be synchronized between redundant components, and runtime data that can be recalculated after a redundancy failover. Alarm condition states is one example of runtime data that must be synchronized, whereas control logic variables that are recalculated in each task cycle do not need to be synchronized.

Redundancy may be configured in the engineering tool for controllers, gateways and devices. As an example, an engineer may be allowed to select between five major configuration alternatives.

1) Hardware redundancy based on multiplicated hardware units.

2) Hardware redundancy based on one hardware unit being redundant for multiple hardware units.

3) Hardware redundancy based on spare capacity in other controllers, gateways and devices, 4) Software redundancy (multi-version fault tolerance), and 5) Hardware redundancy based on edge and cloud resources All configuration alternatives may be based on redundant control services. Each control service may have one or multiple redundant control services running in the same node or in different node(s). Control service states in the active and redundant control services may be synchronized. The synchronization may be based on either a warm standby concept or a hot standby concept. In the warm standby concept, the redundant control service states are synchronized using states collected in the active control service and transferred to the redundant control service. In the hot standby concept, the redundant control service states are synchronized by a transfer of all input process data from the active to the redundant control services followed by a synchronized parallel execution in the active and redundant control services. The platform has no states that need to be synchronized.

FIGS. 4a-4d illustrate configuration alternatives 1-4 discussed above, (alternative 5 is not illustrated in these figures). In the first alternative shown in FIG. 4A, one node is duplicated. More particularly, there is a first node 50 comprising a first control service 52 providing a first control function A and a third control service 54 providing a second control function B, where both control services 52 and 54 are connected to the network 16 via a first platform 68 at least comprising a middleware service. There is also a second node 76 providing a second control service 78 implementing the first control function A and a fourth control service 80 providing the second control function B, where both these control services 78 and 80 use a second platform 82, where the both comprise a middleware service and optionally also a communication interface and/or a node manager. The realization of the first control function A in the first control service 52 may in this case be the same as the realization of the first control function A in the second control service 78, for instance through having the same source code. It is possible that also the realizations of the second control function are the same. As an example, the first and third control services 52 and 54 and the first platform 68 in the first node 50 are active, while the second and fourth control services 78 and 80 and the second platform 82 in the second node 76 are in standby. As mentioned above, the platforms comprise a middleware service. The platform may optionally also comprise a node manager and/or a communication interface for vertical communication.

Figure 4A:
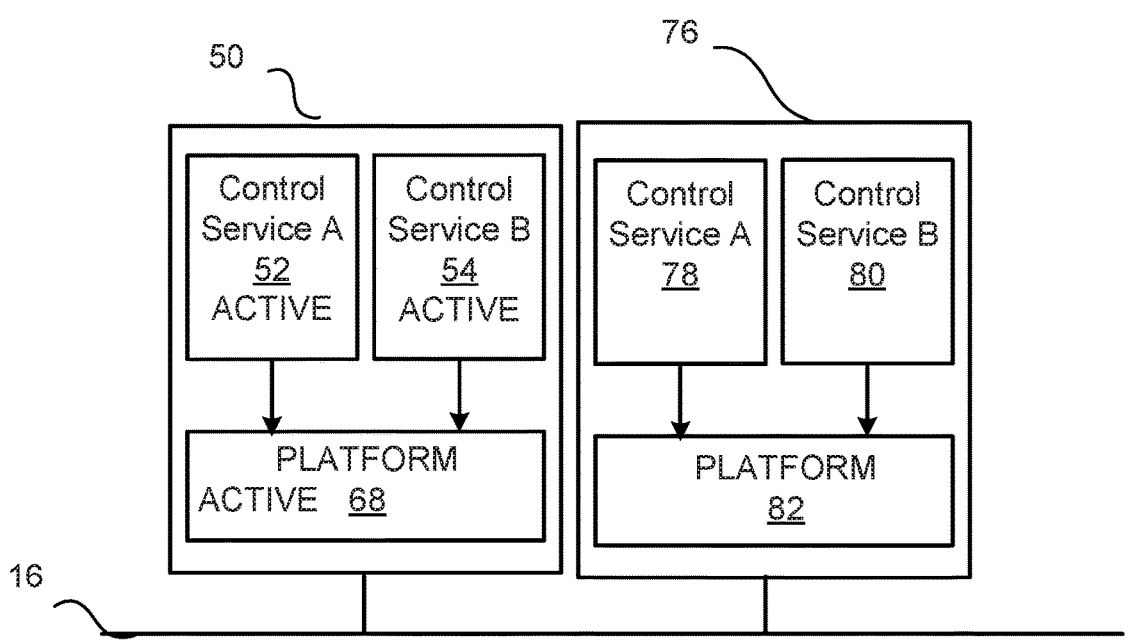
FIG. 4a schematically illustrates a first redundancy alternative for such nodes.
Figure 4B:
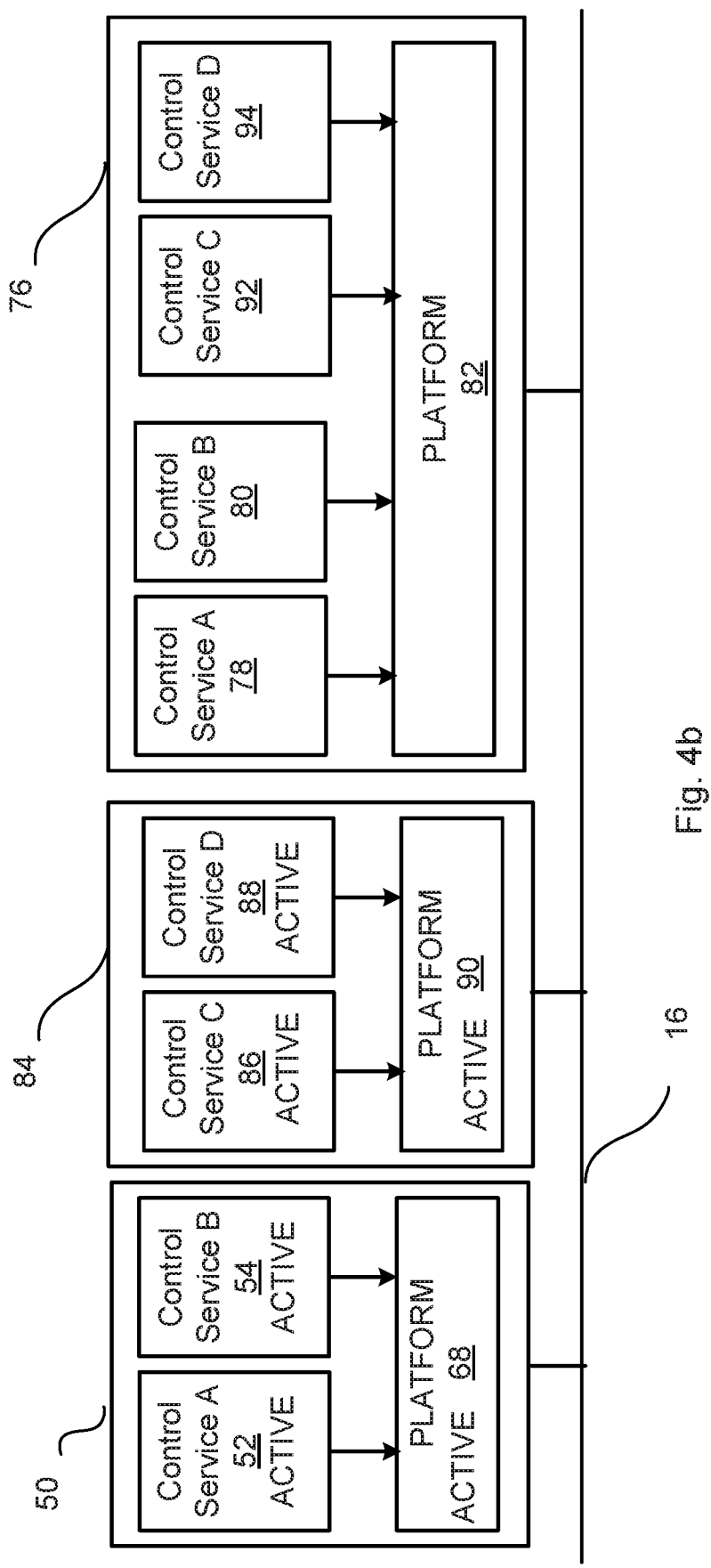
FIG. 4b schematically shows a second redundancy alternative for the nodes.

In the second alternative, shown in FIG. 4b, there is one node being redundant for two other nodes. There is in this case a first node 50 comprising the first control service 52 providing the first control function A and the third control service 54 providing the second control function B, where both control services 52 and 54 are connected to the network 16 via the first platform 68. There is also a third node 84 comprising a fifth control service 86 providing a third control function C and a seventh control service 88 providing a fourth control function D, where both these control services use a corresponding third platform 90 in the third node 84. Finally, there is the second node 76 comprising the second control service 78 providing the first control function A and the fourth control service 80 providing the second control function B. In this alternative, the second node 76 additionally comprises a sixth control service 92 providing the third control service C and an eighth control service 94 providing the fourth control function D, where all these four control services use the second platform 82 of the second node 76. In this case the first and third nodes 50 and 84 are active, while the second node 76 is in standby.

Figure 4C:
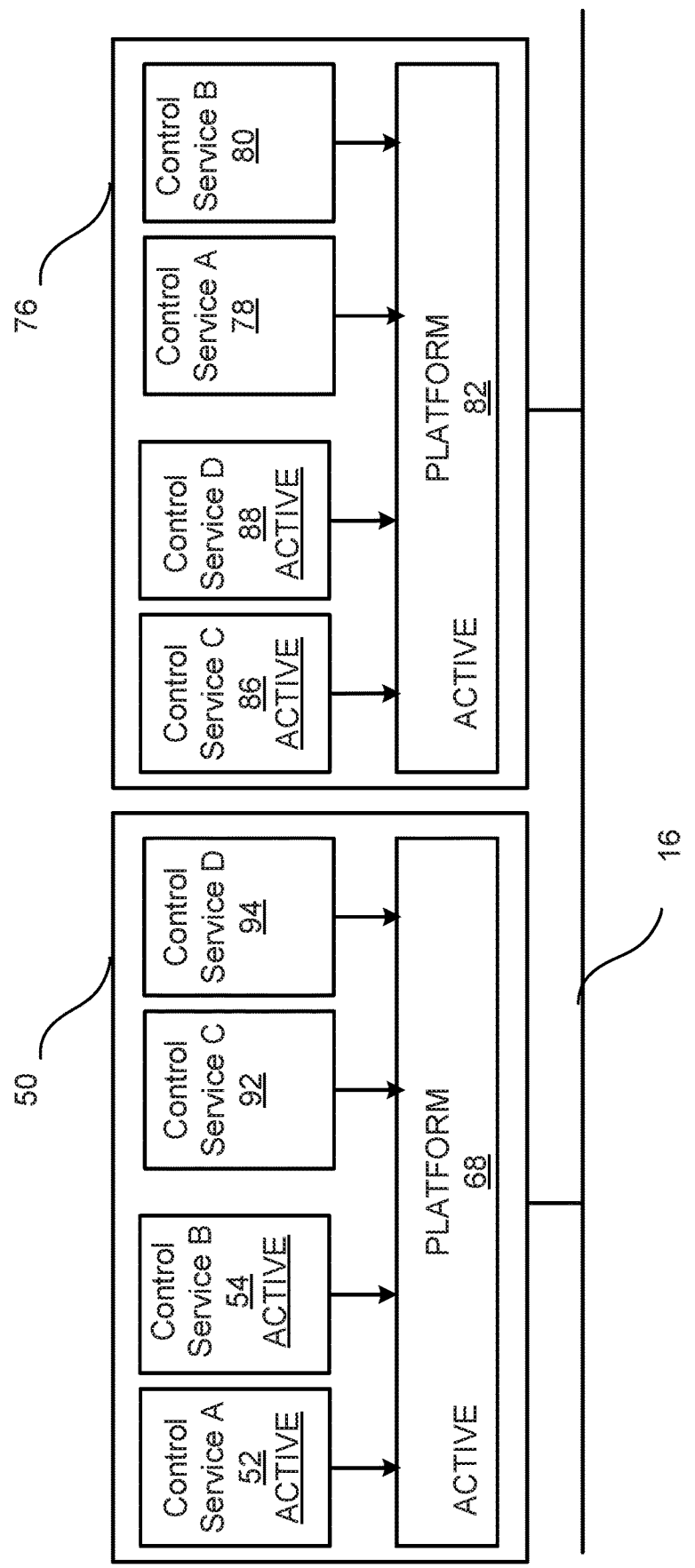
FIG. 4c schematically shows a third redundancy alternative for the nodes.

In the third alternative, shown in FIG. 4c, two nodes are redundant for each other (no extra hardware). In this case the first node 50 comprises the first and the third control services 52 and 54 providing the first and the second control functions A and B, as well as the sixth and the eighth control services 92 and 94 providing the third and the fourth control functions C and D. All these control services 52, 54, 92 and 94 thereby use the first platform 68. In this case the second node 76 comprises the second and fourth control services 78 and 80 providing the first and second control functions A and B as well as the fifth and seventh control services 86 and 88 providing the third and fourth control functions. All these control services 78, 80, 86 and 88 thereby use the second platform 82. In the first node 50 the first and third control services 52 and 54 are active, while the sixth and eighth control services 92 and 94 are in standby. In the second node 76, the fifth and seventh control services 86 and 88 are active, while the second and fourth control serves 78 and 80 are in standby. Both platforms 68 and 82 are also active.

Figure 4D:
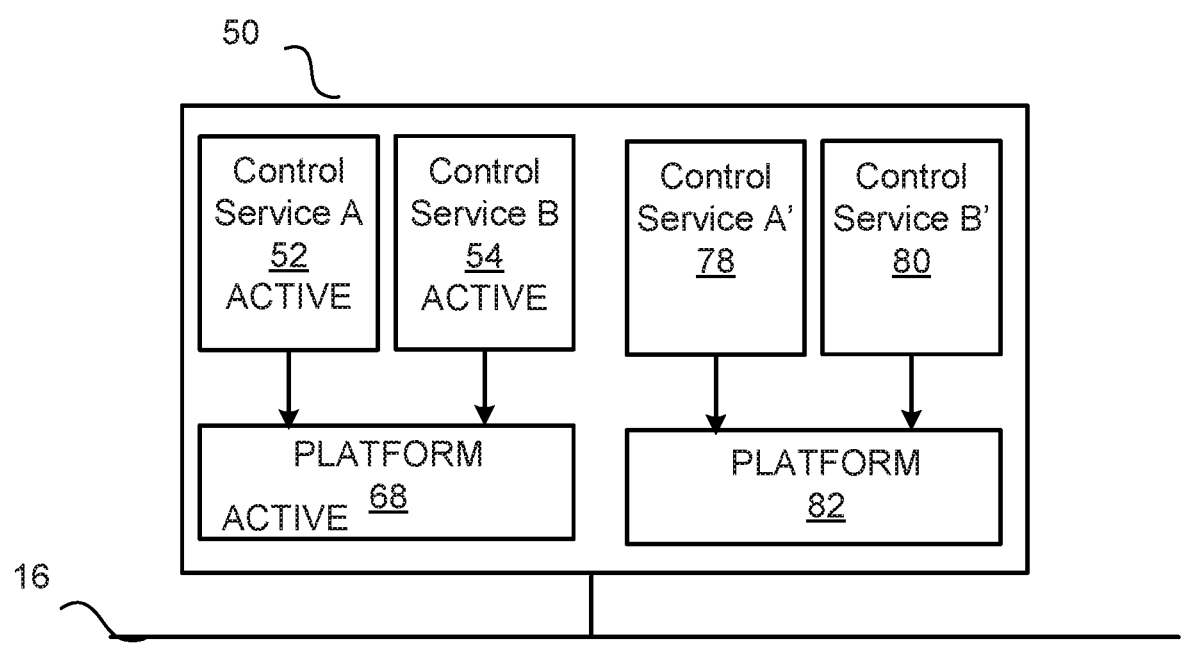
FIG. 4d schematically shows a fourth redundancy alternative for the nodes.

In the last alternative, shown in FIG. 4d all software components have been developed differently. The configurations are thus different from each other. As can be seen the first node 50 comprises the first control service 52 providing the first control function and the third control service 54 providing the second control function, where both control services 52 and 54 again use the first platform 68. However, the first node 50 also comprises the second control service 78 providing the first control function and the fourth control service 80 providing the second control function as well as the second platform 82 provided for their communication. In order to achieve software redundancy, the first control function implemented in the first and second control services have been differently developed, for instance by different groups of developers. The source code may thus differ. In order to differentiate between the versions, the first control function in the first control service 52 is denoted A, while the first control function in the second control service 78 is denoted A'. The realization of the first control function A provided by the first control service 52 thereby at least partly differs or is at least partly different from the realization of the first control function A' provided by the second control service 78. Also the second control function B and B' provided by the third and fourth control services 54 and 80 may differ from each other in the same way. In this case there is thus only the first node 50, comprising the first and third control services 52 and 54 providing the first and second control functions A and B that are active as well as comprising the second and fourth control services 78 and 80 providing the first and second control functions A' and B' and that are in standby. It should here be understood that the use of different software realizations of the same function may also be made when providing the software function in different nodes. It can also be applied for the third and fourth control functions.

Depending on the type of controller/gateway/device, some of the alternatives might not be selectable. E.g. for devices, and for gateways for non-Ethernet based protocols, alternatives 2) and 3) might not be applicable.

In the first configuration alternative the engineer can select between duplicated hardware units, triplicated hardware units etc., depending on what is supported for a specific controller, gateway or device type. A node address for the redundant node(s) may have to be configured.

In the second configuration alternative the engineer may specify the node address for the redundant node, being redundant for a group of nodes.

In the third alternative, the engineer may specify the node address for where the redundant control service(s) shall be running. E.g. a redundant control service execution engine could be allocated to controller, gateway or device node with spare execution resources.

In the fourth alternative, the engineer may specify where the software redundant control service shall execute, in the same node or in a different node.

In the last alternative, the redundancy node may run in the edge or in the cloud. The edge or cloud node is only used until the failing embedded node has been replaced. Depending on the type of controller/gateway/device, this alternative might or might not be selectable.

As an alternative to node addresses, node names that are resolved to node ids in runtime by discovery could be considered.

Software redundancy (alternative 4) and hardware redundancy can be combined, resulting in a highly reliable process control system.

Before sending the configuration to the nodes, the engineering tool may check that the nodes are able to run the control and platform services needed for the redundancy setup. If not, firmware may need to be upgraded.

The configuration tool may then send configuration data and configuration commands to the active nodes in the redundancy setup. It is thereafter possible that the active nodes have the responsibility to coordinate the configuration of the redundant nodes by sending configuration data and configuration commands to them. The Node Manager in the active nodes may forward the platform configuration to its redundant node(s) and the control service configurations to the nodes where the redundant control services shall execute. As an alternative configuration data and configuration commands for the redundant nodes may be sent directly to the redundant nodes from the configuration tool.

The redundancy configuration, e.g. a listing of active and redundant nodes and control services, may be a part of the platform configuration.

As can be seen above, there are a number of ways in which redundancy may be realized. Operation in order to change an active entity, either a node, a control service or both will now be described with reference being made to FIG. 5, which shows a number of activities in a method of providing redundancy in the network centric process control system according to a first embodiment and being performed for the first and second control services, where the first control service 52 implements the first control function A and is set to act as an active control service and the second control service 78 also implements the first control function A and is set to act as a standby control service for the first control function.

The network centric process control system in which the method is implemented has previously been described in detail. In the system the first control service 52 in the first node 50 implementing the first control function A is set to act as an active control service for the first control function. It also communicates using a first middleware service present in the first platform 68. The second control service 78 also implements the first control function A, is set to act as a standby control service for the first control function and communicates using a second middleware service present in the second platform 82. Process block S102 shows that the first control service 52 performs the first control function A. As can be seen in process block S102, the performing of the first control function by the first control service 52 comprises two activities depicted in process blocks 102a and 102b. In process block S102a, the first control service 52 subscribes, via the first middleware service, to input process data of the first control service 52 and in process block S102b, the first control service 52 publishes, via the first middleware service, output process data of the first control function. Thereby the first control service 52 operating the first control function A is an active control function, while the second control service 78 providing the same first control function A is a passive control service or in standby.

In order to allow a smooth change of active control service, the first and second control services are synchronized with each other. In process block S104 the first control service 52 synchronizes with the second control service 78. The synchronization may be a warm or a hot synchronization, the details of which will be described in more detail below.

As is shown in process block S108, the second control service 78 takes over the role of active control service based on a determination that a fault has occurred in the first node 50. A fault may occur in the first control service 52 or in any of the other components of the first node 50. As can be seen in process block S108b, the taking over of the role of active control service comprises publishing, by the second control service 78 via the second middleware service, the output process data of the first control function based on a subscription of the second control service 78 to the input process data. This subscription may be made prior to the taking over as active control service and with advantage at configuration. Alternatively, the subscription may be made directly after the taking over.

A smooth and seamless taking over of the role as active control service is obtained through the method.

A determination that there is a fault may be performed in the first node 50, for instance by the node manager 72 of the first node 50. However, it may also be made in the second node, with advantage by the node manager of the second node.

The first control service 52 repeats publishing output process data as long as no fault has been determined. The publishing of output process data and synchronization of Control Services is cyclically repeated. As an example, the publishing may be repeated once every 100 ms. Moreover, determination of if there is a fault or not may be performed during the whole course of such publishing and synchronization, where the determining of a fault may be made in the first platform or in the second platform. It should here be realized that subscription to input process data by the second control service may be started after the fault has been determined.

Figure 5:
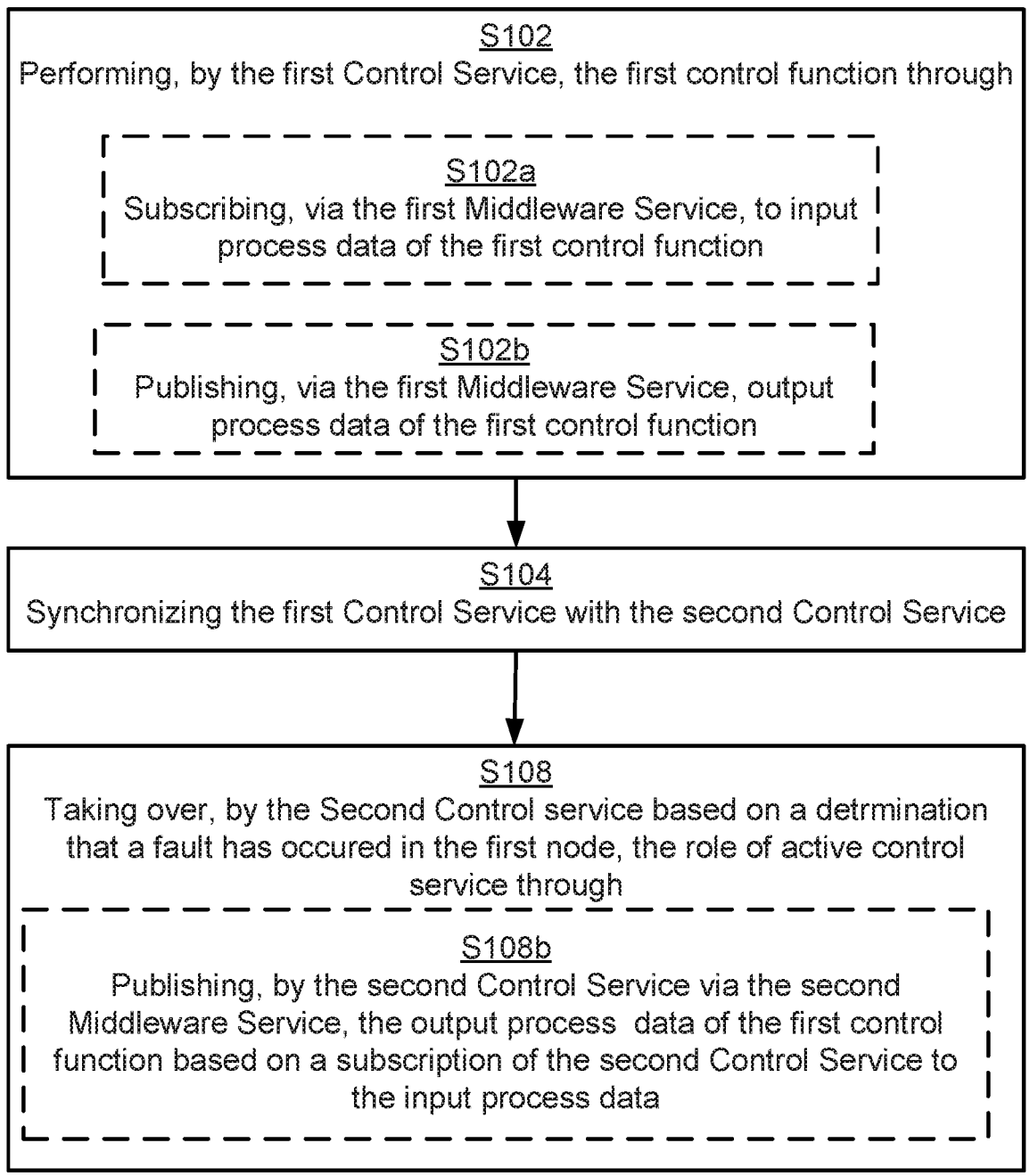
FIG. 5 is a flow chart illustrating a method for providing redundancy in a network centric process control system according to a first embodiment.
Figure 6:
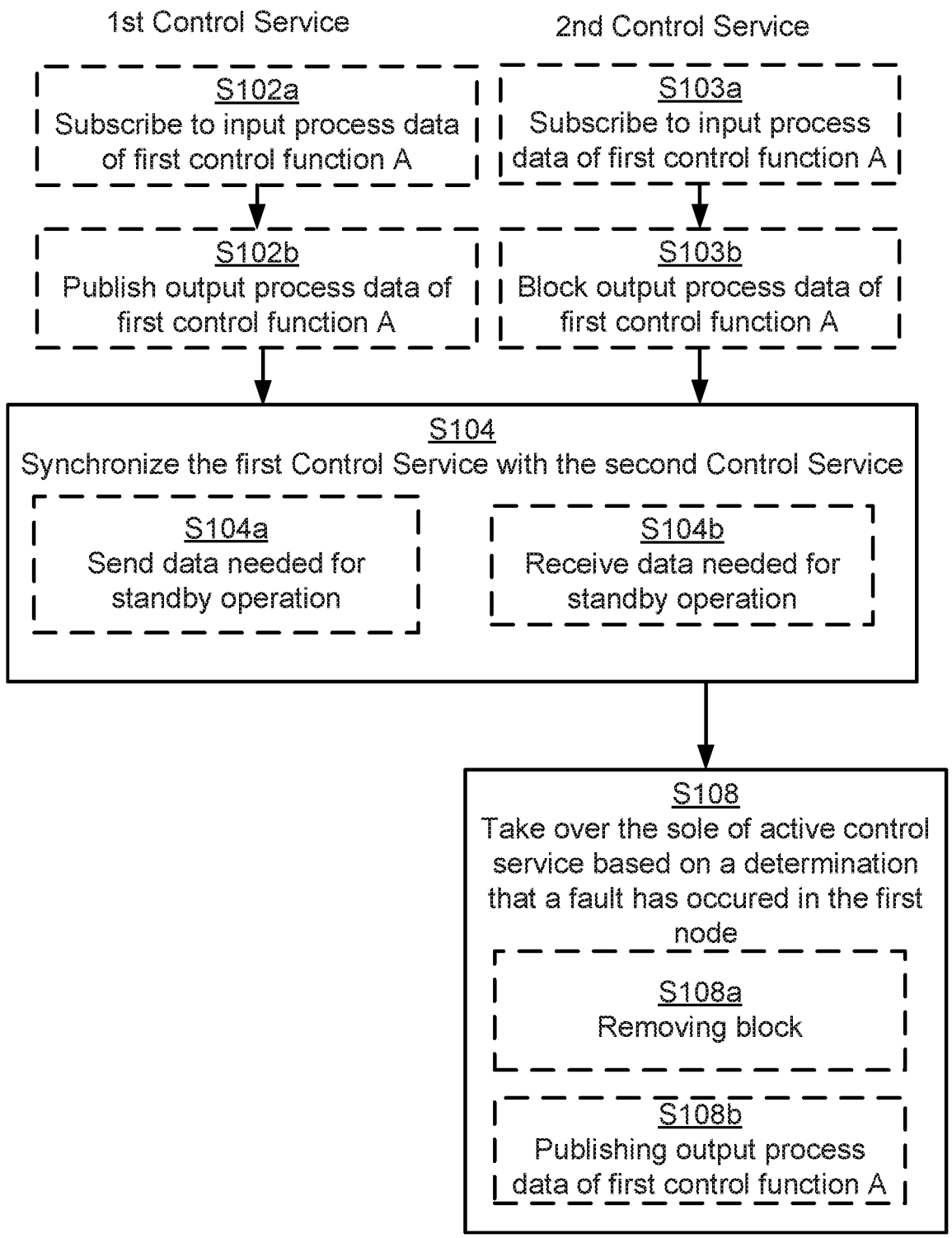
FIG. 6 is a flow chart illustrating a method for providing redundancy in a network centric process control system according to a second embodiment.

Now a second embodiment of the method will be described with reference being made to FIG. 6, which is slightly more detailed than FIG. 5. In FIG. 6, the activities made in relation to the first control service are shown on the left side and the activities made in relation to the second control service are shown on the right side.

Process block S102a shows that the first control service 52 subscribes to input process data of the first control function via the middleware service of the first platform 68 and process block S102b shows that the first control service 52 publishes output process data of the first control function via the middleware service of the first platform 68. This functionality is the same as that described in relation to FIG. 5.

In this embodiment the second control service 78 obtains a subscription to input process data at configuration. Therefore, as is shown in process block S103a, the second control service 78 subscribes to the input process data of the first control function. However, as is shown in process block S03b, output process data from the second control service 78 is also blocked.

Process block S104 shows that the first control service synchronizes with the second control service. As can be seen in process block S104a, the synchronizing may involve the first control service 52 sending data needed for synchronization to the second control service 78. The sending may as an example be made via at least a first node manager of the first platform 68. As can be seen in process block S104b, the second control service 78 receives the data needed for synchronizing.

Process block S108 shows the taking over, by the second control service 78, the role of active control service based on a determination that a fault has occurred in the first node 50. As the second control service 78 already subscribes to the input process data of the first control function, the taking over involves, as is shown in process block S108a, removing the blocking of the second control service 78. Process block S108b shows that when this has been done the second control service 78 publishes the output process data, which again is done using the middleware service of the second platform 82.

Through implementing the subscription in the second control service in this way, the take over may be speeded up.

As was indicated above, during configuration of the active and redundant control services, the redundant control service, here exemplified by the second control service 78, may subscribe to input process data and register its output signals in the second middleware service 108, to be prepared for a failover from the active control service, here exemplified by the first control service 52. However, the redundant control service 78 will in this case not use the received signals during the execution and will not publish its signals in the second middleware service. The signals may be blocked within the redundant control service. It can thereby be seen that during configuration, which is prior to taking over as the role of active control service, the second control service 78 subscribes to input process data of the first control function and the input process data is blocked from being used and output process data is blocked from being published by the second control service 78.

It is possible that a Node Manager in the first platform 68 monitors the operation of the first node 50 and triggers the taking over of the role as active control service by the second control service 78.

One way which the second control service 78 may be triggered to take over the role as active control service is through the Node Manager in the first node sending keep-alive messages to the redundant node. Missing keep-alive messages may then trigger a redundant node to switch to the active role. In case there are multiple redundant hardware nodes (configuration alternative 1) the redundant nodes may need to have an algorithm to decide which one of them to become the active node. The same algorithm may also be used to decide which node is active after a power failure. For software redundant control services executing in the same node, the keep-alive handling and role selection between redundant control services may be handled by the Node Manager component supervision mechanism.

Active and redundant control services are synchronized regularly during the control logic task execution, IO scanning task execution etc. Control services using the warm standby concept are synchronized at the end of the task execution. In this case control service states are transferred from the active to the redundant control service(s). Control services using the hot standby concept are synchronized prior to the task execution through transferring input process data from active to the redundant control service(s) and through synchronizing task execution.

FIGS. 7a-7d illustrate the synchronization of control service states using the first warm standby concept in the same alternatives that were shown in FIG. 4a-4d. In the figures where state synchronization data flows are shown with curved arrows, while dependencies are again shown with straight solid arrows. As can be understood by the direction of the data flows, states are collected in the active control service and transferred to the redundant control service. The platform has no states that need to be synchronized.

Figure 7A:
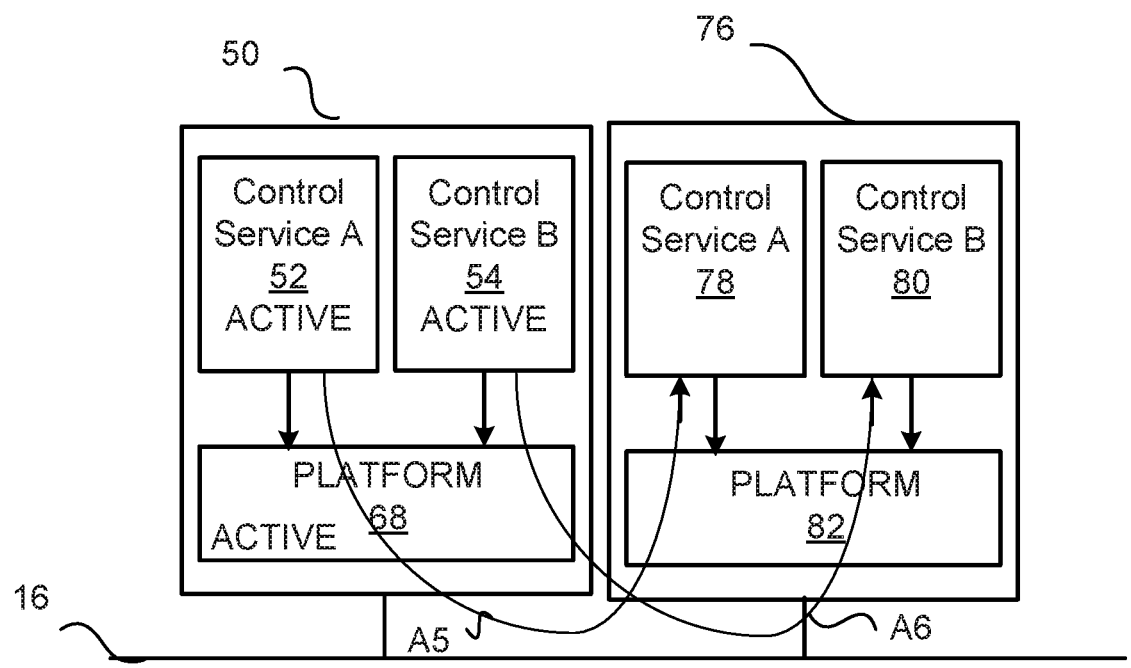
FIG. 7a schematically illustrates synchronization of control service states in the first redundancy alternative.
Figure 7D:
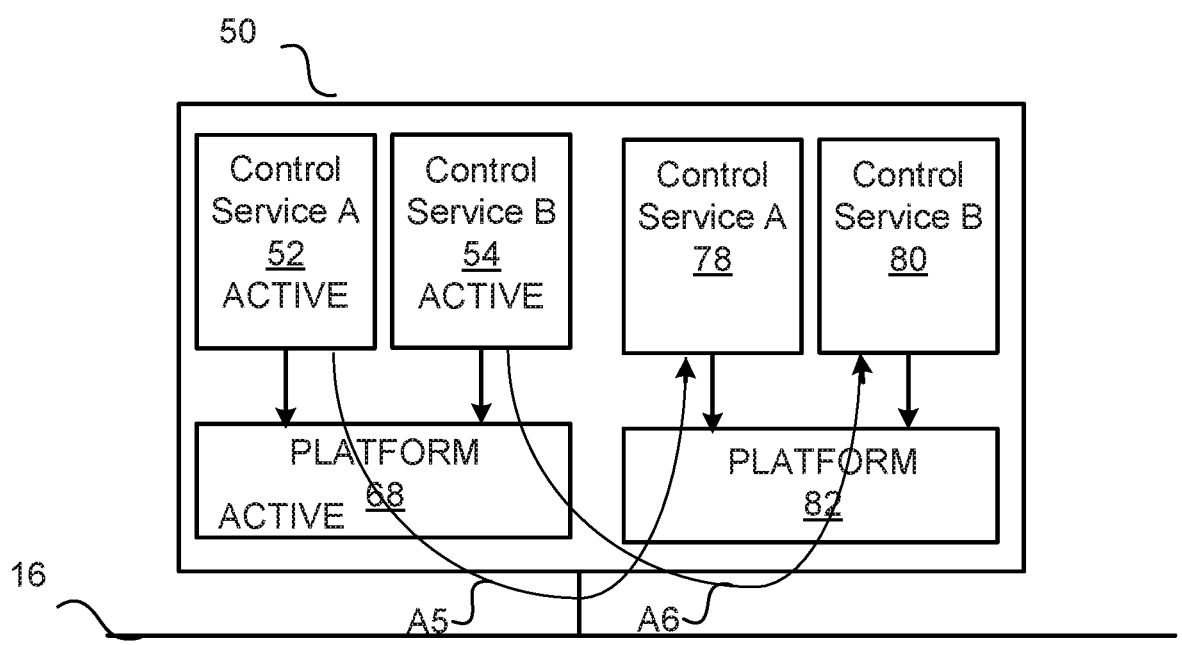
FIG. 7d schematically illustrates synchronization of control service states in the fourth redundancy alternative.
Figure 7B:
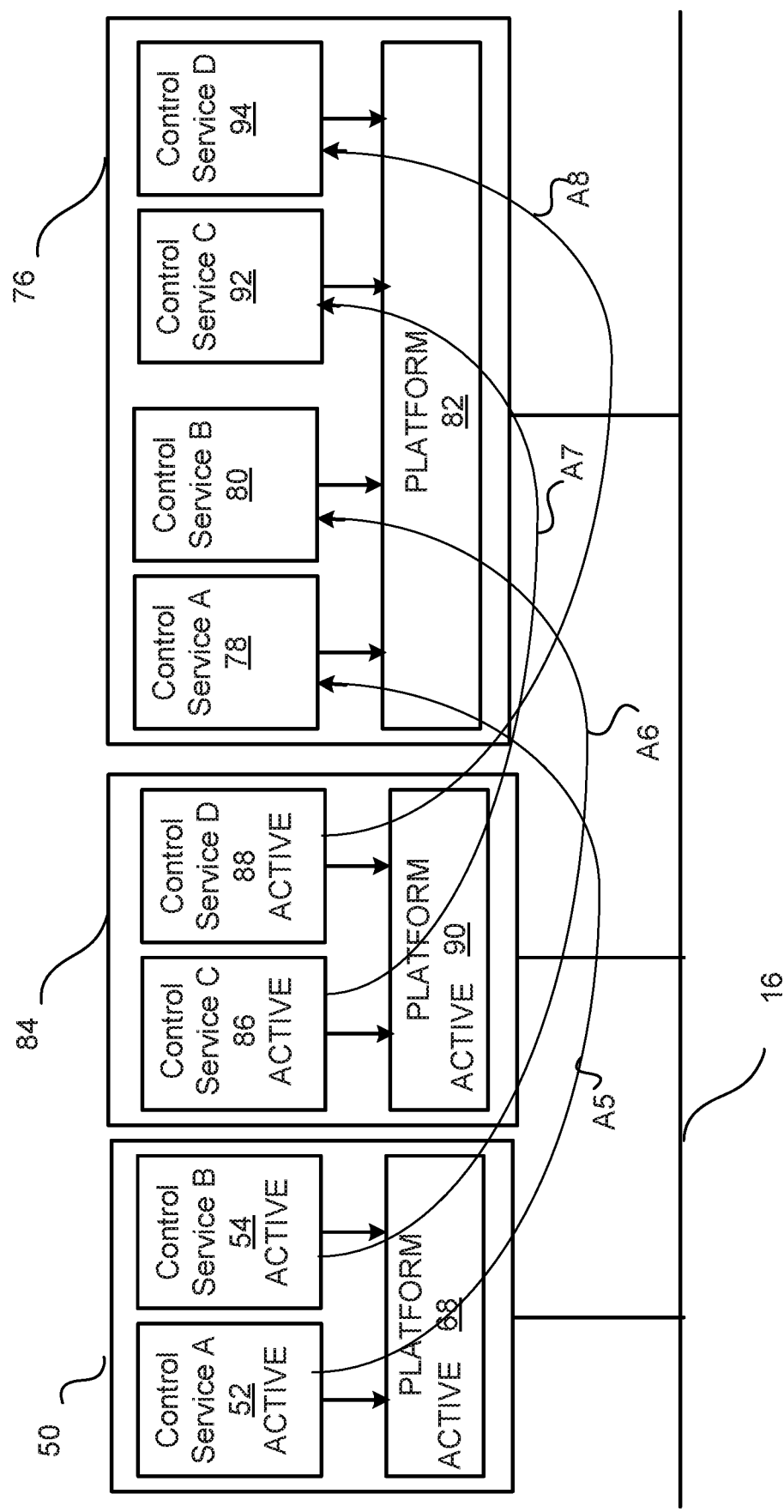
FIG. 7b schematically illustrates synchronization of control service states in the second redundancy alternative.
Figure 7C:
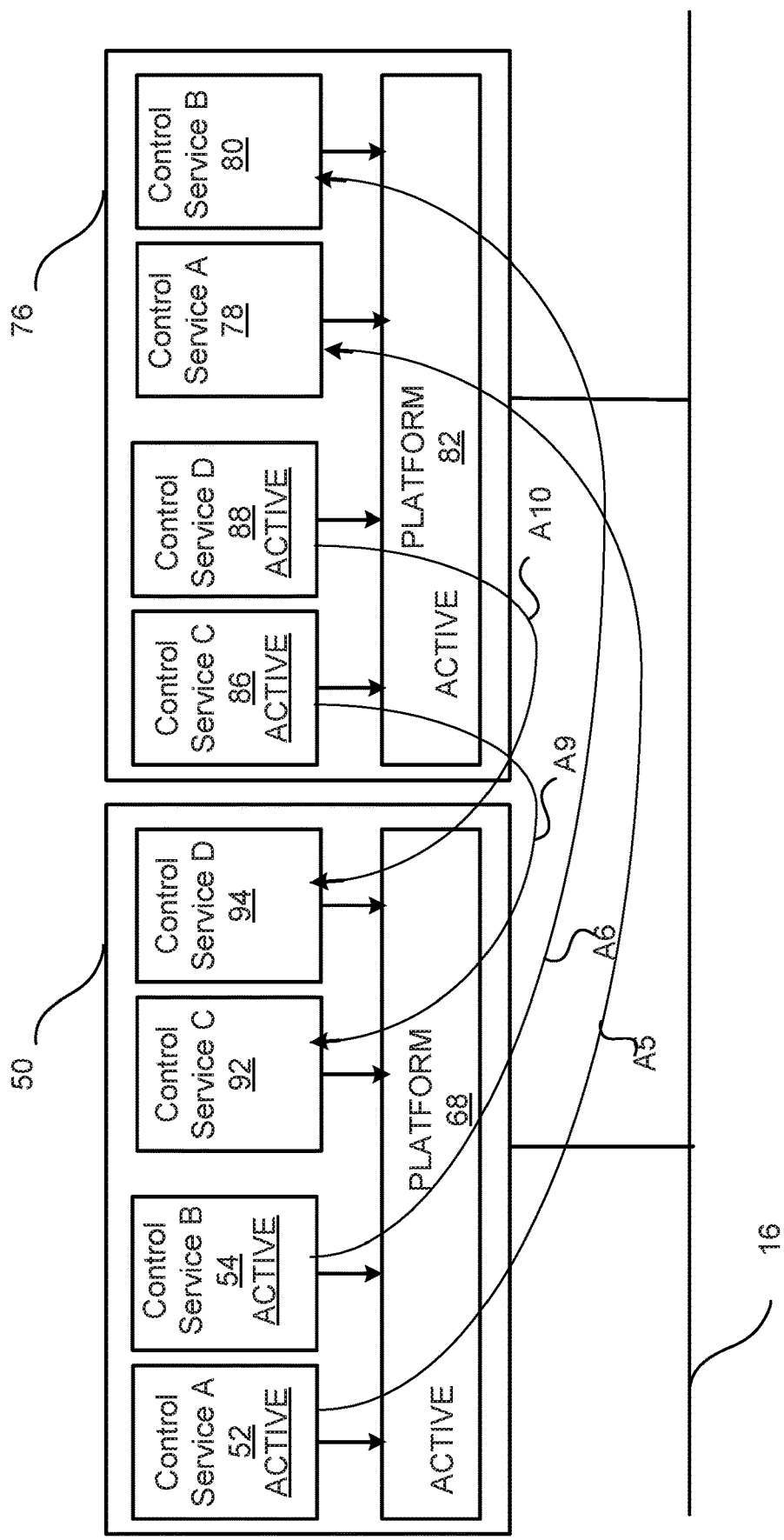
FIG. 7c schematically illustrates synchronization of control service states in the third redundancy alternative.

In the first alternative in FIG. 7a, a fifth arrow A5 indicates synchronization S104 through a state transfer from the first control service 52 in the first node 50 to the second control service 78 in the second node 76, while a sixth arrow A6 indicates a state transfer from the third control services 54 in the first node 50 to the fourth control serves 80 in the second node 76. In the second alternative, shown in FIG. 7b, the fifth arrow A5 indicates synchronization S104 through a state transfer from the first control service 52 in the first node 50 to the second control service 78 in the second node 76, the sixth arrow A6 indicates a state transfer from the third control services 54 in the first node 50 to the fourth control service 8o in the second node 76, a seventh arrow A7 indicates a state transfer from the fifth control service 86 in the third node 84 to the sixth control service 92 in the second node 76 and an eighth arrow A8 indicates a state transfer from the seventh control service 88 in the third node 84 to the eighth control service 940 in the second node 76. In the third alternative, shown in FIG. 7c, the fifth arrow A5 indicates synchronization S1o4 through a state transfer from the first control service 52 in the first node 50 to the second control service 78 in the second node 76 and the sixth arrow A6 indicates a state transfer from the third control services 54 in the first node 50 to the fourth control service 80 in the second node 76. A ninth arrow A9 indicates a state transfer from the fifth control service 86 in the second node 76 to the sixth control service 92 in the first node 50 and a tenth arrow A10 indicates a state transfer from the seventh control service 88 in the second node 76 to the eighth control service 94 in the first node 50. Finally, as is shown in FIG. 7d, in the fourth alternative, the fifth arrow A5 indicates synchronization S104 through a state transfer from the first control service 52 to the second control service 78 and the sixth arrow A6 indicates a state transfer from the third control service 54 to the fourth control service 80, which transfer is made within the first node 50.

Figure 8A:
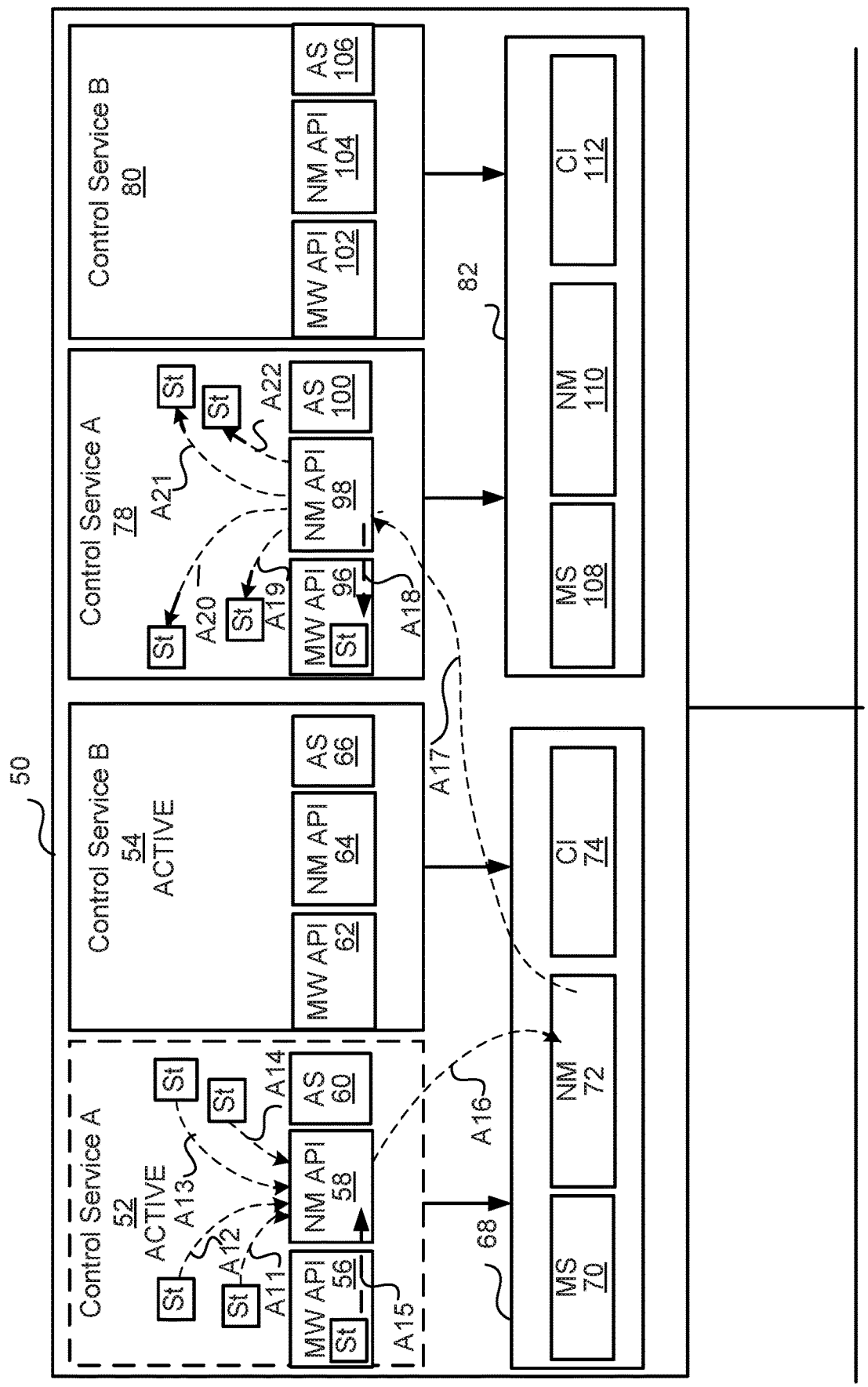
FIG. 8a illustrates a more detailed synchronization of control service states in the fourth redundancy alternative for a warm synchronization concept.
Figure 8B:
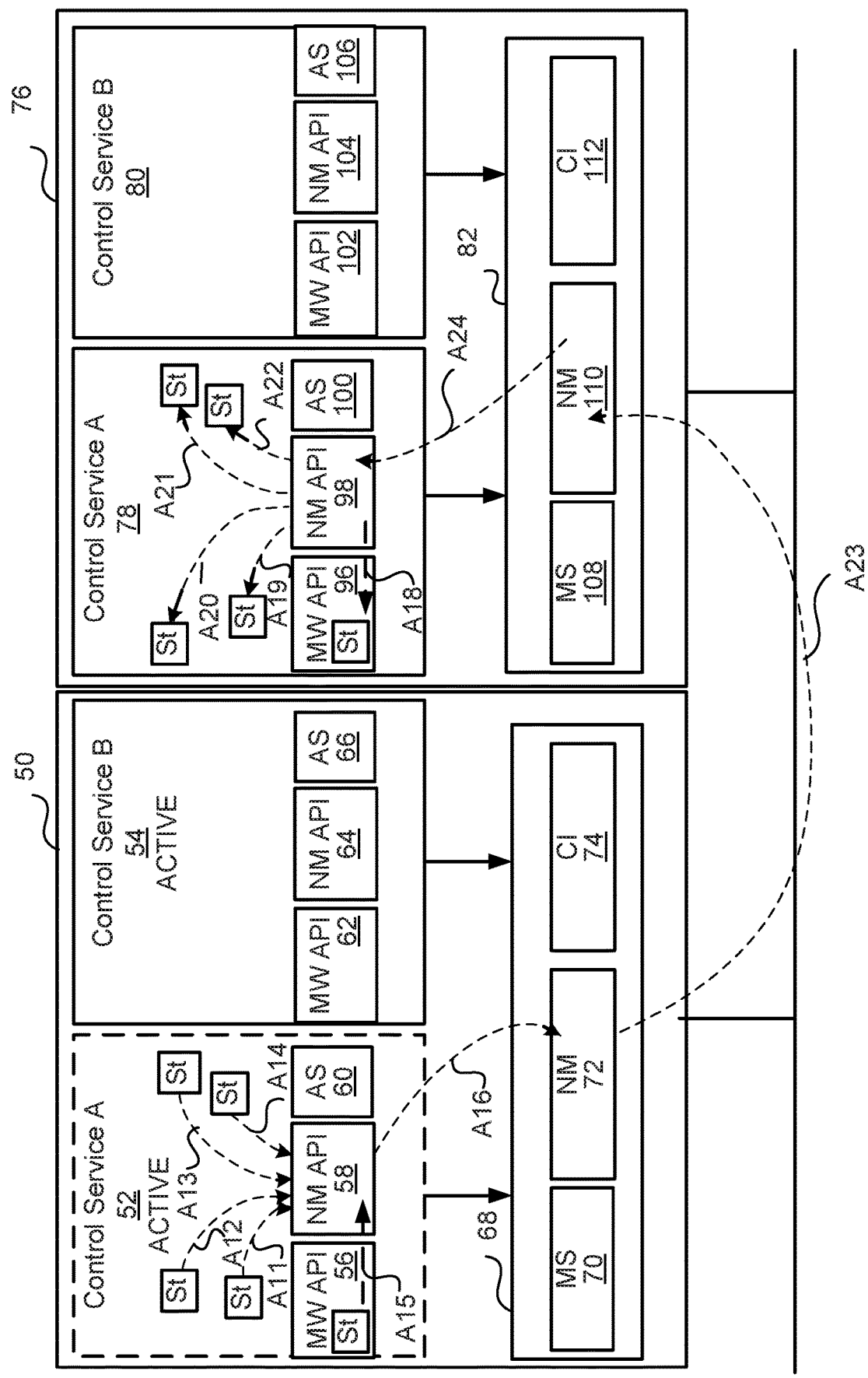
FIG. 8b illustrates a more detailed synchronization of control service states in the first redundancy alternative for the warm synchronization concept.

FIGS. 8a and 8b show a more detailed view of the synchronization of control service states for the warm standby concept. FIG. 8a illustrates the redundancy configuration alternative where the active and redundant control services are executing in the same node, i.e. the previously described fourth alternative, while FIG. 8b shows the redundancy configuration according to the first alternative. As can be seen in FIGS. 8a and 8b the first control service 52 comprises a first MW API 56, a first NM API 58 and a first AS 60, the second control service 78 comprises a second MW API 96, a second NM API 98 and a second AS 100, the third control service 54 comprises a third MW API 62, a third NM API 64 and a third AS 66, while the fourth control service 80 comprises a fourth MW API 102, a fourth NM API 104 and a fourth AS 106. The first platform 68 for the first and third control services 52 and 54 in the first node 50 comprises a first MS 70, a first NM 72 and a first CI 74, while the second platform 82 provided for the second and fourth control services 78 and 80 comprises a second MS 108, a second NM 110 and a second CI 112. In FIG. 8a the second platform 82 is placed in the first node 50, while in FIG. 8b it is placed in the second node 76. In the figures dependencies are again shown as straight solid arrows, while state synchronization data flows are shown as dashed arrows. In the drawings it can also be seen that the first control service 52 has four internal states St and one state St in the first MW API 56. In a similar manner the second control service 78 has four internal states St and one state St in the second MW API 96. All these states are synchronized.

In order to send data needed for synchronization, S104a, all control logic variables etc. of the active control service containing states that may need to be retained, are collected and submitted to the NM API subcomponent, which may package them into a container and forward them to NM. This is exemplified for the first control service 52, where an eleventh arrow A11, a twelfth arrow A12, a thirteenth arrow A13 and a fourteenth arrow A14 indicate the transfer of four states St from the interior of the first control service 52 to the first NM API 58, while a fifteenth arrow A15 indicates the provision of the state St in the first MW API 56 to the first NM API 58, As is indicated by a sixteenth arrow A16 the NM API 58 then forwards the collected states to the first NM 72. As is indicated by a seventeenth arrow A17, the first NM 72 thereafter sends the data needed for synchronization, i.e. the collected states, to the NM API in the redundant control service where they are used for update of the control service states, this means that the first NM 72 sends S104a the states St to the second NM API 98 of the second control service 78, which thus receives S104b these states and then as can be seen through an eighteenth arrow A18 updates the state in the second MW API 96 as well as updates the four states St internally in the second control service 78 as can be seen by arrows A19, A20, A21 and A22.

FIG. 8b illustrates the redundancy configuration alternatives where the active and redundant control services are executing in different nodes. The states St are collected in the same way in the first control service 52 and submitted to first NM 72. Also here, the first NM 72 packages and forwards S104a the states. However, as is indicated by a twenty-third arrow A23, the packaged states are in this case forwarded to the second NM 110 in the redundant node 76, which thereby receives S104b the states. As is indicated by a twenty-fourth arrow A24, the second NM 110 then forwards the states to the other redundant control service, here the second control service 78, for update of the control service states. More particularly, it forwards the states St to the second NM API 98, which in turn updates the state in the second MW API 96 as well as in the interior of the second control service 78. This is done in the same way as in FIG. 8a. In order to simplify the figure, the collection and update of states are only showed for one control function, the first control function A implemented by the first and second control services 52 and 78. Naturally the same principles may be applied also on the third and fourth controls services 54 and 80.

The collected states may be transferred in a Firmware (FW) and Hardware (HW) independent format to enable usage of redundant hardware units with different firmware versions and different HW architectures.

Figure 9:
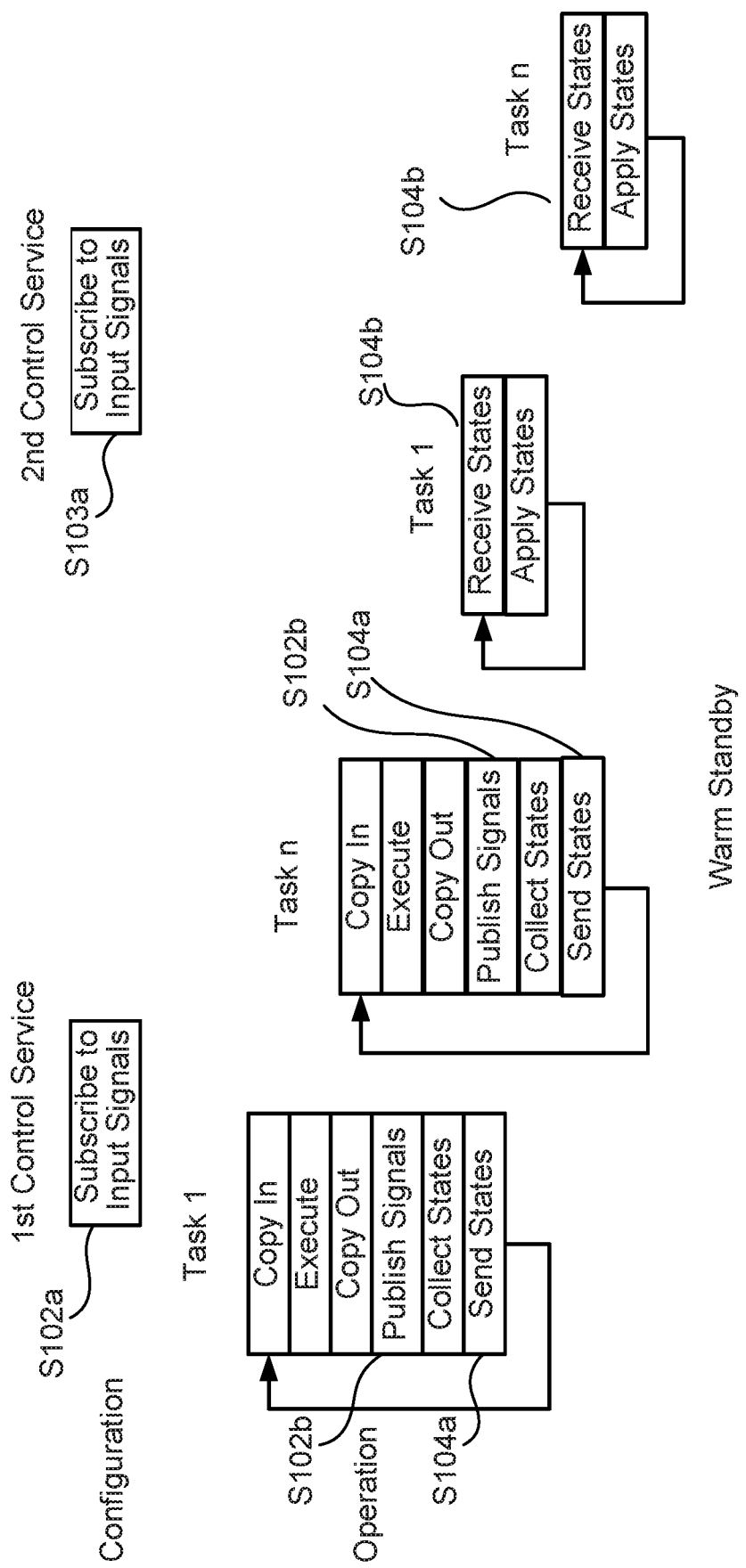
FIG. 9 schematically illustrates operation of the warm synchronization concept in two control services.

The operation of the warm standby concept is also schematically indicated in FIG. 9. As can be seen the first control service subscribes S102A to input process data comprising signal S, as does the second control service, S103a.

The first control service 52 then operates on the input data, which may involve Copy In of the input data, Execution on the input data and Copy Out of output data. This is followed by publishing output signals S102b, collecting states and the sending states S104a to the second control service. This cycle is repeated, where n such cycles are indicated in FIG. 8. For every such cycle the second control service receives the states, S104b and applies the states, which is thus repeated n times.

In the hot standby concept, the active and redundant control services run in parallel, states are synchronized by a transfer of all process data from the active to the redundant control service(s), followed by a synchronized parallel execution in the active and redundant control services. Outputs are controlled by the active control service only.

In a similar way as NM and NM API handle the synchronization of control service states, NM and NM API handle the synchronization of the control service input process data as well as synchronization of the control service execution.

To simplify the following description of the synchronization, only one active control service with one redundant control service will be described. Synchronization of multiple control services is similar; the only difference is in the number of control services that are synchronized. The active and redundant control services will execute in different nodes. Synchronization of control services executing in the same node are very similar to synchronization of control services executing in different nodes and therefore not described. The synchronisation will be described with reference being made to FIG. 10, which shows the same node structure as in FIG. 9, where again dependencies are shown with straight solid arrows and additionally input data flows are shown with dashed arrows, while input synchronization data flows are shown with solid curved arrows. In the figure there is also a signal S, control logic/scanner variables V and a vertical communication entity E.

During configuration of the active and redundant control services, the active control service, here exemplified by the first control service 52, subscribes 102a to input process data in the form of input signals S. Also, the redundant control service, here exemplified by the second control service 78, may subscribe S103a to input process data in the form of input signals S. The redundant control service 78 may additionally register its output signals in MS 108 (using MW API 96), to be prepared for a failover from the active control service 52. However, the redundant control service 78 will not use the received signals during the execution and will not publish its signals in MS 108. MW API 96 blocks the signals. It can thereby be seen that the second control service 78 has a subscription to input process data of the first control function, which subscription has been made during configuration, which is well prior to the taking over the role of active control service. Moreover, while the second control service is in standby the input process data is blocked S103b from being used and output process data is blocked from being published in the second control service 78. Instead of using the input process data to which it subscribes, the redundant control service 78 will use input signals S received S104b from the active control service 52.

Figure 10:
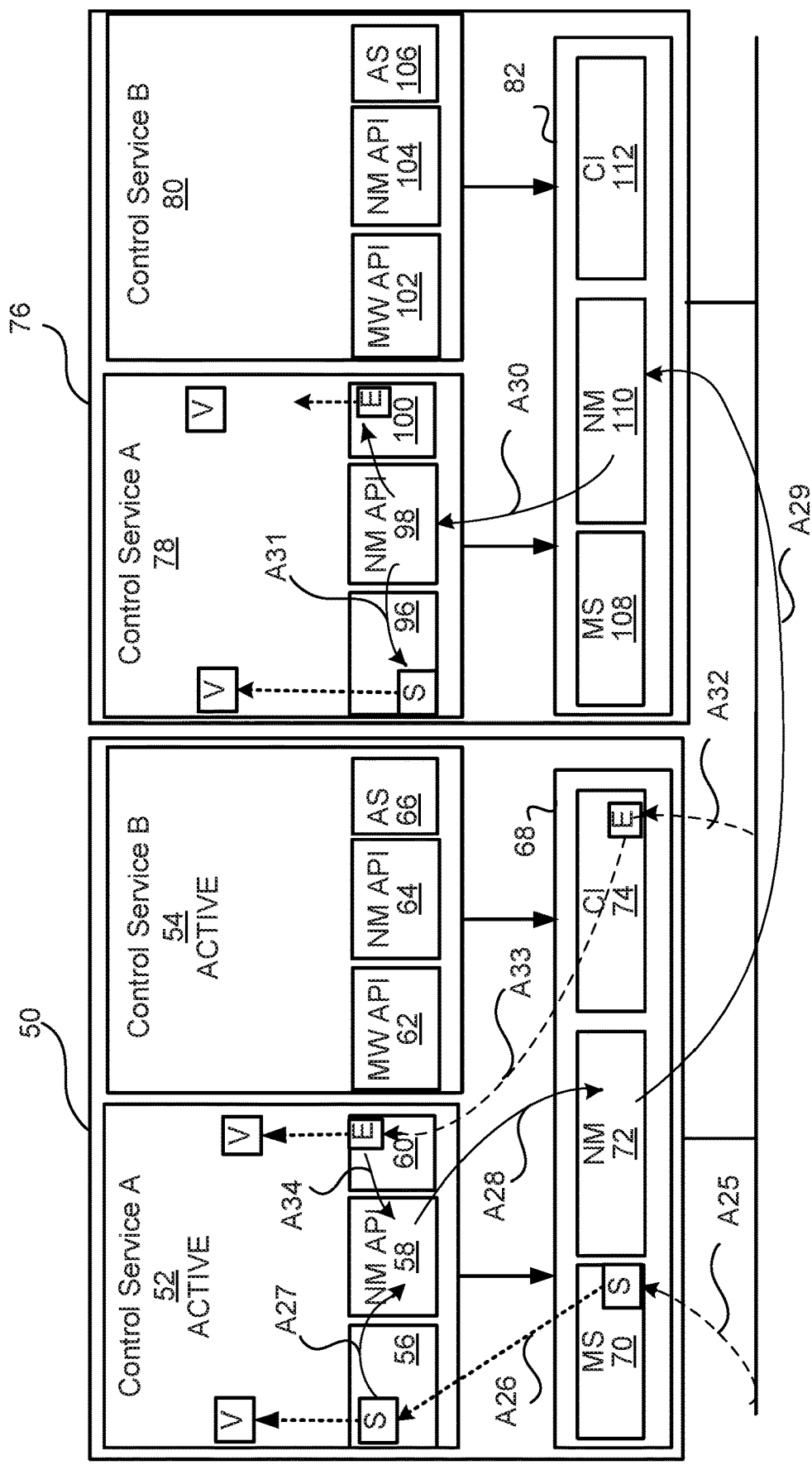
FIG. 10 schematically illustrates synchronisation of input data in the first redundancy alternative for a hot synchronization concept.

As is shown with a twenty-fifth arrow A25, the active control service 52 receives input data in the form of signals S according to its subscription, which signals are as is indicated with a twenty-sixth arrow A26, forwarded to MW API 56 in the active control service 52. As is indicated by a twenty-seventh arrow A 27, the MW API 56 also forwards all received inputs to NM API 58, which packages them into a version independent container and, as is indicated by a twenty-eighth arrow A28 submits them to NM 72. As is indicated by a twenty-ninth arrow A29, NM 72 in turn forwards the package to NM 110 in the redundant node 76. As is indicated by a thirtieth arrow A30, NM 110 then forwards these signals to NM API 98 in the redundant control service 78, which, as is indicated by a thirty-first arrow A31, makes them available to MW API 96. The MW API 96 then applies the signals in the control service, for instance as variables V in the control service. FIG. 10 illustrates the synchronization of input process data. If the redundant control process becomes active, the blocking is removed.

Other types of input process data, e.g. from communication with upper system parts, from an IO scanner or from a communication stack may also be synchronized. As is indicated by a thirty-second arrow A32, Input process data E from upper system parts are received by the CI 74, which as is indicated by a thirty-third arrow A33, forwards them to AS 60 in the active control service 52. AS 60 sends, as is indicated by a thirty-fourth arrow A34, the input process data E to NM API 58, which forwards it, as is indicated by arrows A28, A29 and A30, to NM API 98 of the redundant control service 78 (via NMs 72 and 110). Other input process data received from e.g. an IO scanner in a control service, is thereby sent by the active control service 52 to the redundant control service 78 using the NM API 58. In case the redundant control service 78 is an IO scanner or something similar, it may not be supposed to set any output on the IO and devices during the evaluation. This may be handled by the active control service 52.

Figure 11:
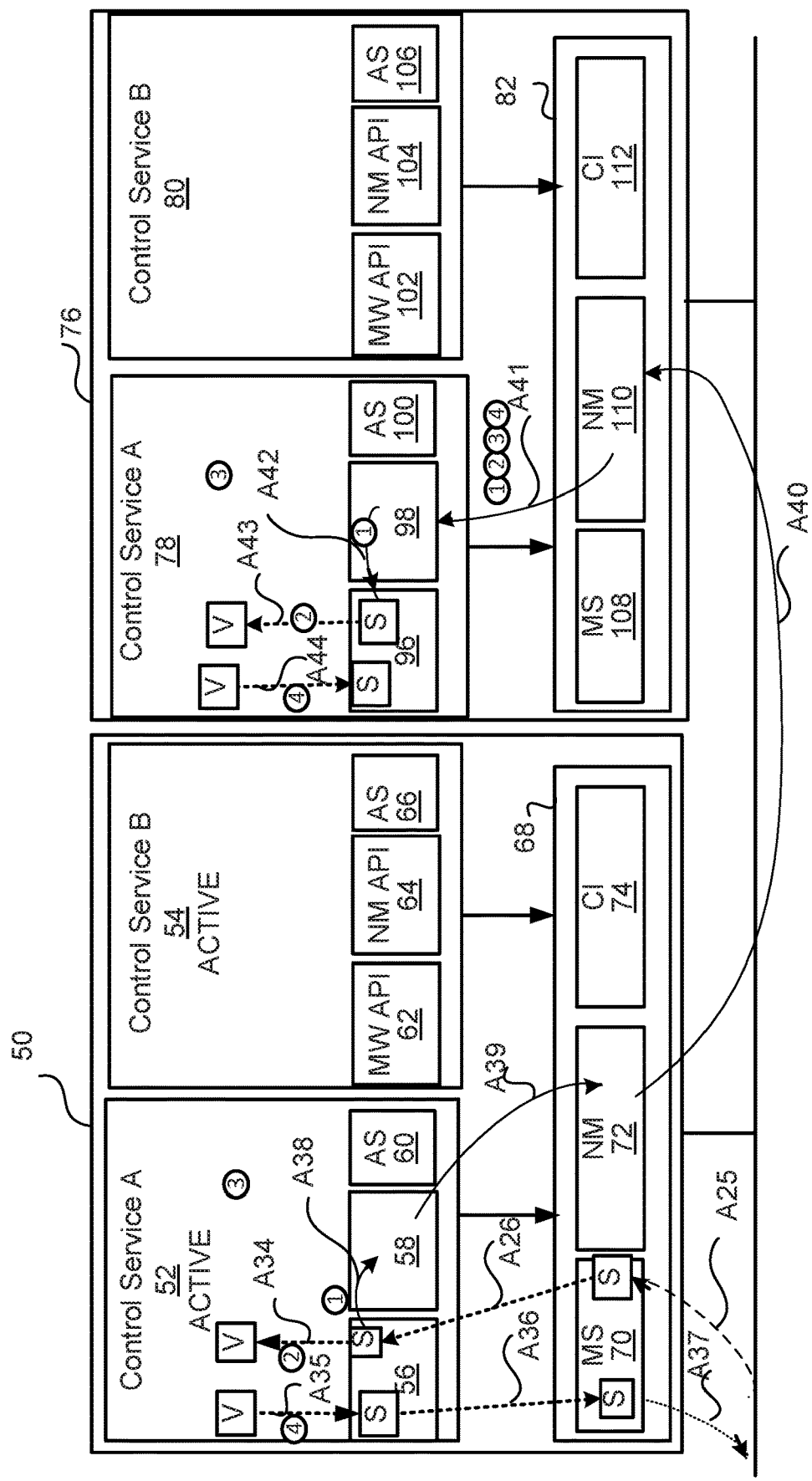
FIG. 11 schematically illustrates synchronization of execution in the first redundancy alternative for the hot synchronization concept.

After the input data has been transferred, the control service executions are synchronized. Such synchronization is schematically shown in FIG. 11, which shows the same node structure as in FIG. 10. In the figure, dependencies are again shown as solid straight arrows and synchronization data flows as solid curved arrows. There are also signals S and Control logic/scanner variables V, and input/output data flows shown as dashed arrows. The figure also discloses input synchronization 1, copy-in synchronization 2, task execution synchronization 3, and copy-out synchronization 4.

A received signal S, to which the first control service subscribes S102a and shown through arrows A25 and A26, is as an example used as a variable in the first control function. The signal S may therefore, as is indicated by a thirty-fourth arrow A34, be copied in (2) as a variable V in the first control service 52. The first control function may also be executed (3) by the first control service 52 and, as is indicated by a thirty-fifth arrow A35, output variables V may therefore be copied out 4 into the first MW API 56 and thereafter submitted, as is indicated by a thirty-sixth arrow A36, to the first MS 70, which then publishes the data S102b as is indicated by a thirty-seventh arrow A37 on the network 16 Control service execution synchronization involves synchronizing of input data as described above, copying signal values to internal variables, executing control or scanner logic, and copying internal variable values to the signals. MW API 56 submits the synchronization information (e.g. copy-in 2, execute 3, copy-out 4 or data synch (1)) to NM API 58, which forwards the input data and synchronization commands using the infrastructure as described above for the synchronization of inputs. Input data may be synched (1) as is inferred by a thirty-eighth arrow A38. Various trigger signals may be transferred from the first control service to the second control service for synchronizing activities such as copy in, execute, copy out and synch. These trigger signals may be provided to the first NM API 58, which may then, as is indicated by a thirty-ninth arrow A39, send them to the first NM 72. The first NM 72 in turn sends, as is indicated by a fortieth arrow A40, trigger signals to the second NM 110 of the second control service 78, which are in turn forwarded, as is indicated by a forty-first arrow A41, to the second NM API 98. The trigger signals here trigger the same activities to be performed in the second control service 78. The synch 1 of the second control service 78, is, as is indicated by a forty-second arrow A42, synchronized with the synch (1) in the first control service 52, the copy in (2) in the second control service 78 is, as is indicated by a forty-third arrow A43 synchronized with the copy in (2) performed in the first controls service 42, the copy out 4 performed by the second control service 78, is as is indicated by a forty-fourth arrow A44 synchronised wait the copy out A35 of the first control service 52 as are the executions 3 are synchronized as is, the trigger signals for the activities 1, 2, 3, 4 to the second NM API 96—synchronized with the transfer of signals (1) from the second NM API 98 to the second MW API 96. Thereby the operations being triggered by the triggers are carried out in parallel in the first and second control service 52 and 78. From the figure it can be seen that output signals are published, S102b by the active control service 52 only. However, although only the first control service 52 is shown as receiving input signals S, it should be realized that also the second control service 78 receives these.

Figure 12:
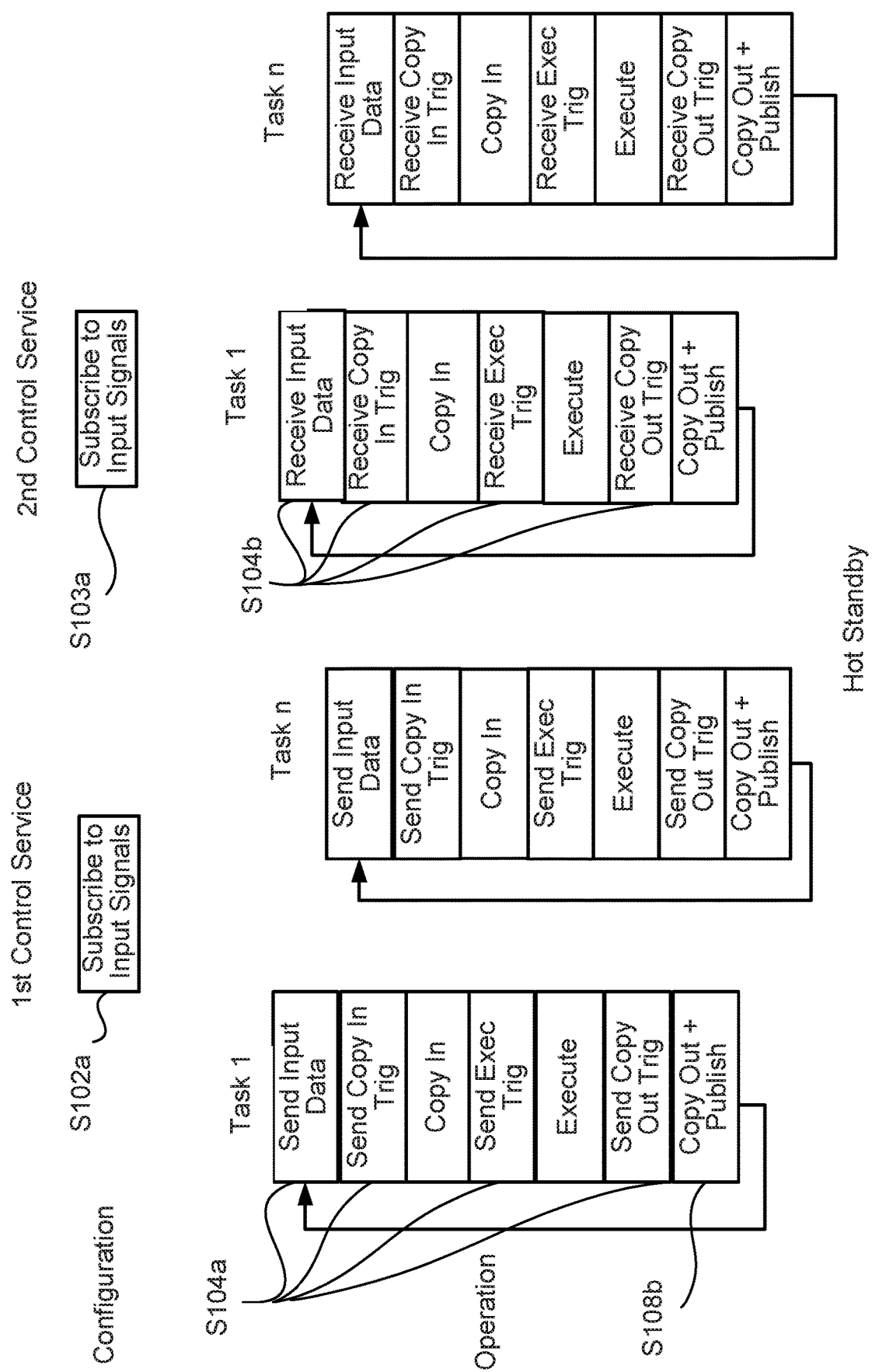
FIG. 12 schematically illustrates operation of the hot synchronization concept in two control services.

An example on how the synchronization could take place is schematically shown in FIG. 12. The first control service again subscribes to input signals S102a and the second control service subscribes to the same input signals, S103a. The first control service 52 then sends the input data to the second control service as well as sends a trigger for the Copy In operation, which are received by the second control service 78. The sending of input data and Copy In trigger is a sending S104a of data needed for standby operation and the reception of it by the second control service 78 is the reception S104b of data needed for standby operation. Thereafter the Copy In of the input data is performed synchronized by the first and second control services 52 and 78. The first control service 52 may thereafter send a trigger for the Execute Operation, which is received by the second control service 78. The sending of an Execute Trigger is a sending S104a of data needed for standby operation and the reception of it by the second control service 78 is the reception S104b of data needed for standby operation. Thereafter the Execution of the first control function A is performed synchronized by the first and second control services 52 and 78. The first control service 52 may thereafter send a trigger for a Copy Out operation, which trigger is received by the second control service 78. The sending of Copy Out trigger is a sending S104a of data needed for standby operation and the reception of it by the second control service 78 is the reception S104b of data needed for standby operation. Thereafter the Copy Out is performed together with publishing of the output data synchronized by the first and second control services 52 and 78, where the publishing S102b made by the first control service 52, is the output of the first control function A. However, the publishing made by the second control service 78 is blocked. This cycle is repeated, where n such cycles are indicated in FIG. 12.

The described hot stand by concept could be extended with a voting mechanism. Such a mechanism would be of interest only in case of multiplicated hardware units (configuration alternative 1) with more than one extra hardware unit. It would require a negotiation between the NM API subcomponents to decide which one of the control services to control the outputs. After each task execution, the results from the execution could be transferred from the redundant to the active control services, which selects the output values that a majority of the control services has calculated.

If the component supervision mechanism in NM 72 detects an error in one of the components in the node, different actions may be taken depending on the redundancy configuration. If the failing component has been configured for software redundancy and the redundant component runs in the same node, NM 72 may switch to the redundant component. If the failing component has been configured for software redundancy but the redundant component runs in a different node, or if only hardware redundancy has been configured, NM 72 may close down this node and a redundant node will take over.

As was stated above, a control service has no knowledge about where its control service communication partners are allocated. Therefore, an active control service that publishes a data set (a group of signals) can be replaced by a redundant control service in the same node or in a different node without affecting the subscriber(s) of the data set, and an active control service that subscribes to a data set can be replaced by a redundant control service in the same node or in a different node without affecting the publisher of the data set. Thereby the change is seamless.

Other types of communication, e.g. access of runtime data from operations and engineering, may require different actions depending on the type of communication. If the communication is based on publish/subscribe to multicast addresses, there is no need for action. If the communication is based on a client server pattern and there has been a failover to another node there is need for some handling. One alternative is that the client will have to discover/browse to find the new node.

The previously described variations have a number of advantages:

A flexible redundancy concept for controllers, gateways and devices in a network centric process control system is provided, where different system parts can be configured for different levels of availability, based on criticality, cost etc. Different types of hardware redundancy can also be provided, such as hardware redundancy based on multiplicated hardware units, hardware redundancy based on one hardware unit being redundant for multiple hardware units, hardware redundancy based on spare capacity in other controllers. Also, Software redundancy (multi-version fault tolerance) is possible. It is possible to achieve a high availability by combining hardware and software redundancy. It is furthermore possible to combine redundant hardware units of different hardware types, different software versions, and different operating systems The described advantages are possible due to one or more of the following.

Controllers, gateways and devices have a middleware service for signal exchange that makes it possible for any control service to access any signal in any other control service without knowledge of network layout, control service deployment, or control service internals.

The middleware binding mechanism makes it possible to move a signal publisher from one node to another without affecting the subscribers, and vice versa.

Each component is a separate executable running in a separate operating system process.

Each component has its own "data base" for runtime and configuration data, i.e. there is no separate component acting as a central data base used by all components.

Three platform subcomponents, Middleware API, Node Manager API and Address synchronize, control service states, input process data and control logic/IO scanner execution between the active and redundant control service versions.

Node Manager can synchronize the active and redundant control services even if they run in different nodes.

All synchronization data, i.e. states, inputs etc., are transferred in a FW and HW independent format.

Figure 13:
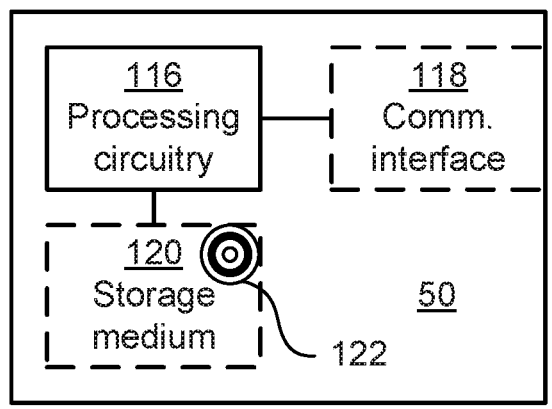
FIG. 13 is a schematic diagram illustrating some components of devices presented herein.

FIG. 13 schematically illustrates, in terms of a number of functional units, the components of a node 50 according to an embodiment. Processing circuitry 116 is provided using any combination of one or more of a suitable central processing unit (CPU), multiprocessor, microcontroller, digital signal processor (DSP), etc., capable of executing software instructions stored in a computer program product 122 (as in FIG. 12), e.g. in the form of a storage medium 120. The processing circuitry 116 may further be provided as at least one application specific integrated circuit (ASIC), or field programmable gate array (FPGA).

Particularly, the processing circuitry 116 is configured to cause the node to perform a set of operations, as disclosed above. For example, the storage medium 120 may store the set of operations, and the processing circuitry 116 may be configured to retrieve the set of operations from the storage medium 120 to cause the node to perform the set of operations. The set of operations may be provided as a set of executable instructions.

Thus, the processing circuitry 116 is thereby arranged to execute the operations that are defined for the node. The storage medium 120 may also comprise persistent storage, which, for example, can be any single one or combination of magnetic memory, optical memory, solid state memory or even remotely mounted memory. The node 50 may further comprise a communications interface 118 at least configured for communications with other components of the node. As such the communications interface 118 may comprise one or more transmitters and receivers, comprising analogue and digital components. The processing circuitry 116 controls the general operation of the node e.g. by sending data and control signals to the communications interface 118 and the storage medium 120, by receiving data and reports from the communications interface 118, and by retrieving data and instructions from the storage medium 230. Other components, as well as the related functionality, of the node are omitted in order not to obscure the concepts presented herein.

Figure 14:
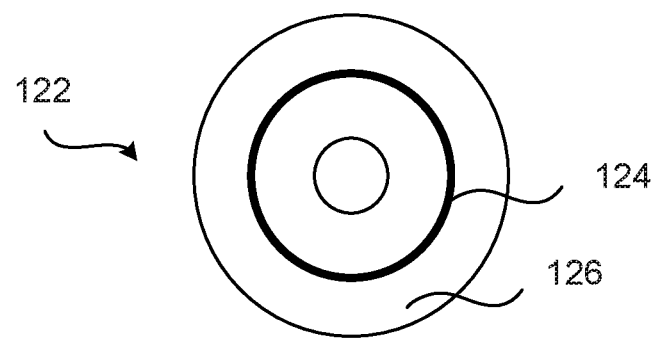
FIG. 14 is a schematic diagram illustrating functional modules of devices presented herein.

FIG. 14 shows one example of a computer program product 122 comprising computer readable storage medium 126. On this computer readable storage medium 126, a computer program 124 can be stored, which computer program 124 can cause the processing circuitry 116 and thereto operatively coupled entities and devices, such as the communications interface 118 and the storage medium 120, to execute herein operations defined for a node. The computer program 124 and/or computer program product 122 may thus provide means for performing any operations of one or more nodes as herein disclosed.

In the example of FIG. 14, the computer program product 122 is illustrated as an optical disc, such as a CD (compact disc) or a DVD (digital versatile disc) or a Blu-Ray disc. The computer program product 122 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 124 is here schematically shown as a track on the depicted optical disk, the computer program 124 can be stored in any way which is suitable for the computer program product 122.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for providing redundancy in a network centric process control system, where at least one node includes at least one control service as well as at least one middleware service for communicating in the process control system, where the control service and middleware service is each a separate executable running in a separate operating system process provided by a real time operating system thereof, where a first control service in a first node communicating via a first middleware service and implementing a first control function is set to act as an active control service for the first control function and a second control service communicating via a second middleware service and implementing the first control function is set to act as a standby control service for the first control function, the method comprising:

performing, by the first control service, the first control function through subscribing, via the first middleware service, to input process data of the first control function and publishing, via the first middleware service, output process data of the first control function, wherein the publishing of data comprises copying by a control service to a middleware service, and publishing, by the middleware service, the data in the network centric process control system and/or to another control service executing in the same node, synchronizing the first control service with the second control service;

taking over, by the second control service based on a determination that a fault has occurred in the first node, the role of active control service, the taking over including publishing, by the second control service via the second middleware service, the output process data of the first control function based on a subscription of the second control service to the input process data.

2. The method according to claim 1, wherein the publishing of data comprises grouping, by the middleware service, publishing process data in data sets, wherein each data set is assigned a multicast address.

3. The method according to claim 1, wherein the synchronizing of the first control service with the second control service includes the first control service sending data needed for standby operation and the second control service receiving the data needed for standby operation.

4. The method according to claim 3, further comprising subscribing, by the second control service, to input process data of the first control function prior to taking over the role of active control service, and blocking, in the second control service, input process data from being used and output process data from being published and removing the blocking after the taking over the role of active control service.

5. The method according to claim 3, wherein the synchronizing of data needed for standby operation includes synchronizing states in the first control function.

6. The method according to claim 5, wherein the sending of data needed for standby operation includes sending states of the first control service to the second control service for application in the second control service.

7. The method according to claim 5, wherein the sending of data needed for standby operation includes sending process input data and triggers causing state changes in the second control service and executing the triggers in parallel in the first and second control service.

8. The method according to claim 1, wherein the synchronizing of data needed for standby operation includes synchronizing states in the first control function.

9. A network centric process control system comprising nodes, each node having a processor and a computer program product storing instructions that, when executed by the processor, causes the node to run at least one control service, where the system includes at least one control service as well as at least one middleware service for communicating in the process control system, where the control service and middleware service is each a separate executable running in a separate operating system process provided by a real time operating system thereof,
wherein in the network centric process control system,
a first control service in a first node communicating via a first middleware service and implementing a first control function is set to act as an active control service for the first control function by performing the first control function through subscribing, via the first middleware service, to input process data of the first control function and publishing, via the first middleware service, output process data of the first control function, wherein the publishing of data comprises copying by a control service to a middleware service, and publishing, by the middleware service, the data in the network centric process control system and/or to another control service executing in the same node,
a second control service communicating via a second middleware service and implementing the first control function is set to act as a standby control service for the first control service,
wherein the first and second process control services are set to synchronize with each other, and
the second control service is configured to take over the role of active control service based on a determination that a fault has occurred in the first node, the taking over including publishing, by the second control service via the second middleware service, the output process data of the first control function based on a subscription of the second control service to the input process data.

10. The network centric process control system according to claim 9, wherein the first control service and the second control service are provided in the same node.

11. The network centric process control system according to claim 9, wherein the first control service and the second control service are provided in different nodes.

12. The network centric process control system according to claim 9, wherein a realization of the first control function in the first control service is different from a realization of the first control function in the second control service.

13. The network centric process control system according to claim 9, wherein a realization of the first control function in the first control service is the same as a realization of the first control function in the second control service.

14. The network centric process control system according to claim 9, wherein the first node further comprises a node manager configured to monitor the operation of the first node and trigger the taking over of the role as active control service by the second control service.

15. A computer program for providing redundancy in a network centric process control system comprising at least one control service as well as at least one middleware service for communicating in the process control system, where the control service and middleware service is each a separate executable running in a separate operating system process provided by a real time operating system thereof, wherein a first control service in a first node communicating via a first middleware service and implementing a first control function is set to act as an active control service for the first control function and a second control service communicating via a second middleware service and implementing the first control function is set to act as a standby control service for the first control function, the computer program including computer program code, which when run in network centric process control system:
causes the first control service to perform the first control function through subscribing, via the first middleware service, to input process data of the first control function and publish, via the first middleware service, output process data of the first control function, wherein the publishing of data comprises copying by a control service to a middleware service, and publishing, by the middleware service, the data in the network centric process control system and/or to another control service executing in the same node,
causes the first and second process control services to synchronize with each other, and
causes the second control service to take over the role of active control service based on a determination that a fault has occurred in the first node, the taking over including publishing, by the second control service via a second middleware service provided for the second control service, the output process data of the first control function based on a subscription of the second control service to the input process data.

* * * * *